(12) United States Patent
Hamann et al.

(10) Patent No.: US 11,555,109 B2
(45) Date of Patent: Jan. 17, 2023

(54) IN-SITU POLYMER BLEND FOR A TIRE

(71) Applicant: TRINSEO EUROPE GMBH, Horgen (CH)

(72) Inventors: Evemarie Hamann, Halle (DE); Dominique Thielemann, Leipzig (DE); Sven K. H. Thiele, Halle (DE)

(73) Assignee: TRINSEO EUROPE GMBH, Horgen (CH)

( * ) Notice: Subject to any disclaimer, the term of this patent is extended or adjusted under 35 U.S.C. 154(b) by 306 days.

(21) Appl. No.: 16/628,493

(22) PCT Filed: Jul. 16, 2018

(86) PCT No.: PCT/EP2018/069225
§ 371 (c)(1),
(2) Date: Jan. 3, 2020

(87) PCT Pub. No.: WO2019/020417
PCT Pub. Date: Jan. 31, 2019

(65) Prior Publication Data
US 2020/0131358 A1     Apr. 30, 2020

(30) Foreign Application Priority Data
Jul. 27, 2017   (EP) .................................... 17183494

(51) Int. Cl.
| | | |
|---|---|---|
| *B60C 1/00* | (2006.01) | |
| *B60C 11/00* | (2006.01) | |
| *C08F 293/00* | (2006.01) | |
| *C08L 53/00* | (2006.01) | |

(52) U.S. Cl.
CPC .......... *C08L 53/005* (2013.01); *B60C 1/0016* (2013.01); *B60C 1/0025* (2013.01); *B60C 11/0008* (2013.01); *C08F 293/005* (2013.01); *B60C 2011/0025* (2013.01); *C08F 2438/00* (2013.01); *C08L 2205/025* (2013.01); *C08L 2312/08* (2013.01)

(58) Field of Classification Search
CPC .......... C08F 36/00; C08F 36/04; C08F 36/06; C08F 36/08; C08F 2/001; C08F 2/06; C08L 9/00; C08L 9/06
See application file for complete search history.

(56) References Cited

U.S. PATENT DOCUMENTS

| | | |
|---|---|---|
| 3,078,254 A | 2/1963 | Zelinski |
| 3,244,664 A | 4/1966 | Zelinski et al. |
| 3,281,383 A | 10/1966 | Zelinski et al. |
| 3,692,874 A | 9/1972 | Farrar et al. |
| 3,978,103 A | 8/1976 | Meyer-Simon et al. |
| 4,091,053 A | 5/1978 | Kitchen |
| 4,537,936 A | 8/1985 | Takao et al. |
| 4,616,069 A | 10/1986 | Watanabe et al. |
| 5,405,903 A | 4/1995 | Van Westrenen et al. |
| 6,777,569 B1 | 8/2004 | Westmeyer et al. |
| 10,077,279 B2 | 9/2018 | Rossle et al. |
| 2005/0124740 A1 | 6/2005 | Degussa |
| 2019/0169343 A1 | 6/2019 | Nakatani |

FOREIGN PATENT DOCUMENTS

| | | |
|---|---|---|
| CN | 104650269 | 5/2015 |
| DE | 3243141 | 4/1986 |
| EA | 025835 | 2/2017 |
| EP | 1174449 | 1/2002 |
| EP | 2754674 | 7/2014 |
| EP | 3059256 | 8/2016 |
| EP | 3133093 | 2/2017 |
| GB | 2354243 | 3/2001 |
| JP | S55-56114 | 4/1980 |
| JP | 2018002965 | 1/2018 |
| RU | 2111220 | 5/1998 |
| TW | 201516053 | 5/2015 |
| WO | WO 2009/148932 | 12/2009 |
| WO | 2015/010710 | 1/2015 |
| WO | 2017/067877 | 4/2017 |

OTHER PUBLICATIONS

Search Report & Official Action issued in Appl. No. RU2020108184 (dated Aug. 10, 2020).
Search Report & Written Opinion issued in Int'l Appl. No. PCT/EP2018/069225 (dated 2018).
Office Action issued in Appl. No. JP2020-504187 dated Jun. 15, 2021.
English Translation of Office Action issued in Appl. No. RU 2020108184 (dated Jul. 13, 2021).

*Primary Examiner* — Irina S Zemel
*Assistant Examiner* — Jeffrey S Lenihan
(74) *Attorney, Agent, or Firm* — Barnes & Thornburg LLP; G. Peter Nichols

(57) ABSTRACT

The present invention relates to a method for the preparation of a synthetic rubber blend, wherein the blend comprises a high molecular weight polydiene (A) and a low molecular weight polydiene (B). The present invention further relates to a synthetic rubber blend obtainable according to the method described herein; as well as to rubber compositions comprising the blend; and articles, such as tires.

17 Claims, No Drawings

IN-SITU POLYMER BLEND FOR A TIRE

This application is a U.S. nationalization under 35 U.S.C. § 371 of International Patent Application No. PCT/EP2018/069225, filed Jul. 16, 2018, which claims priority to EP Application No. 17183494.8, filed Jul. 27, 2017; the entire contents of each are incorporated herein by reference.

The present invention relates to a method for the preparation of a synthetic rubber blend, wherein the blend comprises a high molecular weight polydiene (A) and a low molecular weight polydiene (B). The present invention further relates to a synthetic rubber blend obtainable according to the method described herein; as well as to rubber compositions comprising the blend; and articles, such as tires.

Synthetic rubber blends are known from various applications in the field of tires, conveyer belts, seals and hoses. Prior art compositions, however, leave room for improvement, inter alia, as there is an increasing desire to reduce fuel consumption and carbon dioxide emission, both factors being influenced by the rolling resistance of a tire. Moreover, additional performance criteria should be improved to satisfy safety requirements. In order to meet this goal, it turned out to be important to provide compositions that show an improved heat generation performance at dynamic load (expressed in terms of a reduced HBU), improved dry handling/snow grip balance (expressed as E'@60° C./E'@-25° C.); and improved wet grip/snow grip properties (expressed in terms of relatively high tan δ @0° C.*$10^3$/E'@-25° C.).

The present inventors have discovered that synthetic rubber blends that are obtainable by the method described in present independent claim 1, i.e. by:

Polymerizing at least one conjugated diene monomer and, optionally, one or more alpha olefin monomers, including aromatic vinyl and vinyl silane monomers, in the presence of one or more polymerization initiators and, optionally, a polar agent in an organic solvent, wherein the step of polymerizing the at least one conjugated diene monomer and, optionally, one or more alpha olefin monomers, including aromatic vinyl and vinyl silane monomers, comprises
(i) a first stage of providing the solvent, a first portion of the at least one conjugated diene monomer and a first portion of one or more polymerization initiators and, optionally, a first portion of the one or more alpha olefin monomers, including aromatic vinyl and vinyl silane monomers, and, optionally, a first portion of the polar agent; and polymerizing the at least one conjugated diene monomer and, optionally, one or more alpha olefin monomers, including aromatic vinyl and vinyl silane monomers, up to a conversion rate of at least 95% to give a mixture comprising a living high molecular weight polydiene polymer or copolymer;
and optionally adding to and reacting with the living high molecular weight polydiene polymer or copolymer a coupling agent to obtain a mixture comprising a living and coupled polymer;
(ii) a second stage of adding to the mixture of stage (i) a second portion of one or more polymerization initiator(s) as well as a second portion of the at least one conjugated diene monomer and, optionally, one or more alpha olefin monomers, including aromatic vinyl and vinyl silane monomers, as well as, optionally, a polar agent;
and polymerizing to obtain a blend comprising a high molecular weight polydiene (A), and a low molecular weight polydiene (B); and
optionally (iii) a third stage of adding to the blend obtained in stage (ii) at least one chain end modifying compound to obtain a blend comprising a chain end modified high molecular weight polydiene (A), and a chain-end modified low molecular weight polydiene (B)
are associated with particularly good properties as they allow the preparation of articles such as tires that are associated with improved product performance properties. These properties can be expressed in a significant improvement associated with a reduced heat build-up (HBU) of the crosslinked polymer formulation; improved rolling resistance and improved dry handling/snow grip as well as improved wet grip-snow grip performance.

SUMMARY OF THE INVENTION

In a first aspect, the present invention therefore relates to a method for the preparation of a synthetic rubber blend, the method comprising the step of polymerizing at least one conjugated diene monomer and, optionally, one or more alpha olefin monomers, including aromatic vinyl and vinyl silane monomers, in the presence of one or more polymerization initiators and, optionally, a polar agent in an organic solvent,
wherein the step of polymerizing the at least one conjugated diene monomer and, optionally, the one or more alpha olefin monomers, including aromatic vinyl and vinyl silane monomers, comprises
(i) a first stage of providing the solvent, a first portion of the at least one conjugated diene monomer and a first portion of one or more polymerization initiators and, optionally, a first portion of the one or more alpha olefin monomers, including aromatic vinyl and vinyl silane monomers, and, optionally, a first portion of the polar agent; and polymerizing the at least one conjugated diene monomer and, optionally, the one or more alpha olefin monomers, including aromatic vinyl and vinyl silane monomers, up to a conversion rate of at least 95% to give a mixture comprising a living high molecular weight polydiene polymer or copolymer;
and optionally adding to and reacting with the living high molecular weight polydiene polymer or copolymer a coupling agent to obtain a mixture comprising a living and coupled polymer;
(ii) a second stage of adding to the mixture of stage (i) a second portion of one or more polymerization initiator(s) as well as a second portion of the at least one conjugated diene monomer and, optionally, of the one or more alpha olefin monomers, including aromatic vinyl and vinyl silane monomers, as well as, optionally, a polar agent;
and polymerizing to obtain a blend comprising a high molecular weight polydiene (A), and a low molecular weight polydiene (B); and
optionally (iii) a third stage of adding to the blend obtained in stage (ii) at least one chain end modifying compound to obtain a blend comprising a chain end modified high molecular weight polydiene (A), and
a chain-end modified low molecular weight polydiene (B).

The present invention thus describes an in-situ method, i.e. a method wherein the high molecular weight polydiene (A) (in the following also referred to as the high molecular weight component) as well as the low molecular weight polydiene (B) (hereinafter also referred to as the low molecular weight component) are prepared in a single polymerization procedure—rather than being prepared individually and then combined by way of physical mixing of the individual components.

The method of preparation of a synthetic rubber blend as described herein allows the preparation of synthetic rubber blends comprising (a) 50-93 parts by weight of a high molecular weight polydiene (A); and
(b) 7-50 Parts by weight of a low molecular weight polydiene (B), wherein the high molecular weight polydiene (A) has a weight average molecular weight (Mw) of from 500-3000 kg/mol and wherein the low molecular weight polydiene (B) has a weight average molecular weight (Mw) of from 0.5-100 kg/mol and wherein the blend has a single glass transition temperature.

DETAILED DESCRIPTION OF THE INVENTION

The method for the preparation of the synthetic rubber blend comprises the step of polymerizing at least one conjugated diene monomer and, optionally, one or more alpha olefin monomers, including aromatic vinyl and vinyl silane monomers, in the presence of one or more polymerization initiators and, optionally, a polar agent in an organic solvent, wherein the step of polymerizing the at least one conjugated diene monomer and, optionally, the one or more alpha olefin monomers, including aromatic vinyl and vinyl silane monomers, comprises (i) a first stage of providing the solvent, a first portion of the at least one conjugated diene monomer and a first portion of one or more polymerization initiators and, optionally, a first portion of the one or more alpha olefin monomers, including aromatic vinyl and vinyl silane monomers, and, optionally, a first portion of the polar agent; and polymerizing the at least one conjugated diene monomer and, optionally, the one or more alpha olefin monomers, including aromatic vinyl and vinyl silane monomers, up to a conversion rate of at least 95% to give a mixture comprising a living high molecular weight polydiene polymer or copolymer;
and optionally adding to and reacting with the living high molecular weight polydiene polymer or copolymer a coupling agent to obtain a mixture comprising a living and coupled polymer;
(ii) a second stage of adding to the mixture of stage (i) a second portion of one or more polymerization initiator(s) as well as a second portion of the at least one conjugated diene monomer and, optionally, of the one or more aromatic vinyl and/or alpha olefin monomers as well as, optionally, a polar agent;
and polymerizing to obtain a blend comprising a high molecular weight polydiene (A), and
a low molecular weight polydiene (B); and
optionally (iii) a third stage of adding to the blend obtained in stage (ii) at least one chain end modifying compound to obtain a blend comprising a chain end modified high molecular weight polydiene (A), and a chain-end modified low molecular weight polydiene (B).

The inventors discovered that the specific polymerization procedure of polymerizing the at least one conjugated diene monomer and, optionally, the one or more alpha olefin monomers, including aromatic vinyl and vinyl silane monomers, that is conducted in the different stages as discussed herein yields a blend of the high molecular and the low molecular weight components (A) and (B) wherein this blend is different from a traditional physical mixture. Specifically, it was found that conducting the step of polymerizing the different monomers in the different stages as described herein allows the provision of a blend with particularly valuable properties that are better than those obtained by standard prior art procedures.

In the first stage (i) of the present method, the solvent, a first portion of the at least one conjugated diene monomer and a first portion of one or more polymerization initiators as well as, optionally, a first portion of the one or more alpha olefin monomers, including aromatic vinyl and vinyl silane monomers, and, further optionally, a first portion of the polar agent are provided so as to as polymerize the at least one conjugated diene monomer and, optionally, the one or more alpha olefin monomers, including aromatic vinyl and vinyl silane monomers, up to a conversion rate of at least 95% to give a mixture comprising a living high molecular weight polydiene monomer or a copolymer.

As used herein, the term conjugated diene monomer describes a monomer that contains conjugated double bonds and thus could be used to prepare polydiene polymers. Preferably, the conjugate diene monomer is selected from 1,3-butadiene, 2-alkyl-1,3-butadiene, 2-methyl-1,3-butadiene, 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene, 1,3-cyclooctadiene and/or conjugated dienes according to Formula 1 (see below), preferably 1,3-butadiene, and/or 2-methyl-1,3-butadiene.

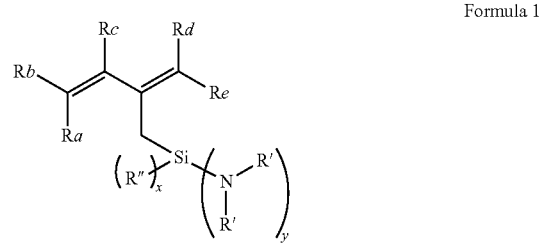

Formula 1 wherein
each R' is independently selected from $C_1$-$C_{12}$ alkyl, $C_6$-$C_{18}$ aryl, $C_7$-$C_{18}$ alkylaryl, tri($C_1$-$C_6$ alkyl, $C_6$-$C_{12}$ aryl or $C_7$-$C_{18}$ alkylaryl)silyl and allyl, wherein two R' groups may be connected to form a ring and the ring may contain, further to the Si-bonded nitrogen atom, one or more of an oxygen atom, a nitrogen atom, an >N($C_1$-$C_6$ alkyl or $C_7$-$C_{18}$ alkylaryl) group and a sulfur atom;
each R" is independently selected from $C_1$-$C_6$ hydrocarbyl;
$R_a$, $R_b$, $R_b$, $R_d$ and $R_e$ are independently selected from hydrogen, methyl and ethyl;
x is an integer selected from 0, 1 and 2, y is an integer selected from 1, 2 and 3 and x+y=3.

The optionally used one or more alpha olefin monomers include vinyl aromatic compounds and vinyl silane compounds. That is to say, the term "alpha olefin monomer" as used herein defines a class of monomers that includes vinyl aromatic compounds and vinyl silane compounds. Preferred examples of vinyl aromatic monomers are styrene, 2-methylstyrene, 3-methylstyrene, 4-methylstyrene, 2,4-dimethylstyrene, 2,4,6-trimethylstyrene, α-methylstyrene, stilbene, 2,4-diisopropylstyrene, 4-tert-butylstyrene, vinyl benzyl dimethylamine, (4-vinylbenzyl)dimethyl aminoethyl ether, N,N-dimethylaminoethyl styrene, N,N-bis-(trialkylsilyl) aminostyrene, tert-butoxystyrene, vinylpyridine, and/or divinylbenzene.

Preferred examples of vinyl silanes are vinyl silane compounds of the formula (VI), formula (IA), formula (IB), formula (4) and formula (2) or multivinylaminosilane compounds of formula (5), as defined below, and/or mixtures thereof.

(i) Vinyl silane according to formula (VI):

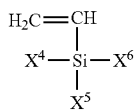

wherein $X^4$, $X^5$, and $X^6$ independently denote a group of formula (VIa), a hydrocarbyl group, or a substituted hydrocarbyl group, and at least one of $X^4$, $X^5$, and $X^6$ is a group of formula (VIa),

wherein $R^3$ and $R^4$ independently denote a hydrocarbyl group having 1 to 10 carbon atoms, a substituted hydrocarbyl group having 1 to 10 carbon atoms, a silyl group, or a substituted silyl group, and $R^3$ and $R^4$ may be bonded so as to form, together with the nitrogen atom, a ring structure, and (ii) Vinyl silanes according to formula (1A) and to formula (1B)

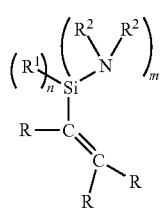

(IA)

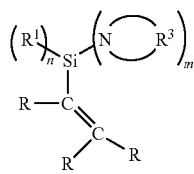

(IB)

where n is a whole number selected from the group consisting of 0-2, and m is a whole number selected from the group consisting of 1-3, with the proviso that the sum of m and n equals 3; where each R is independently a hydrogen, alkyl or aryl group; where each $R^1$ is independently a hydrocarbyl group; where each $R^2$ is independently a hydrocarbyl group having between 2 and 12 carbon atoms; where each $R^3$ is independently a hydrocarbylene group having between 2 and 12 carbon atoms; and where one or more $R^2$ may form a bridge between two nitrogen atoms when m is greater than 1; and (iii) Vinyl silane according to formula (4)

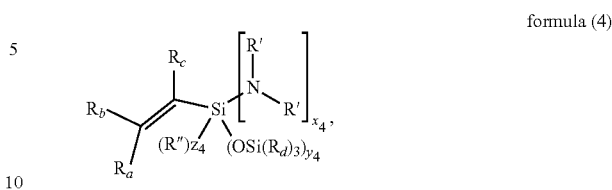

formula (4)

wherein Rd is independently selected from C1-C18 hydrocarbyl; R" is selected from C1-C6 hydrocarbyl; Ra, Rb and Rc are independently selected from hydrogen, methyl, ethyl and vinyl; x4 and y4 are independently integers selected from 1 and 2; z4 is an integer selected from 0 and 1; and x4+y4+z4=3; R' is independently selected from C1-C12 alkyl, C2-C12 alkenyl, C6-C18 aryl, C7-C18 alkylaryl, and tri(C1-C6 alkyl, C6-C12 aryl or C7-C18 (alkylaryl)silyl, wherein the two R' groups may be connected to form a ring and the ring may contain, further to the Si-bonded nitrogen atom, one or more of an oxygen atom, a nitrogen atom, an >N(C1-C6 alkyl) group and a sulfur atom; and one R' may be —Si(CRc=CRaRb)(OSi(Rd)3)y4(R")z4, wherein Ra, Rb, Rc, Rd, R", y4 and z4 are independently as defined above and y4+z4=2.

In preferred embodiments of the vinylsilane compound of formula (4), the parameters and substituents take the following values:

a) (Rd)3 is (methyl, methyl, t-butyl) or (phenyl, phenyl, phenyl) or (t-butyl, phenyl, phenyl) or (hexyl, hexyl, hexyl); R' is independently selected from methyl, ethyl, n-propyl, n-butyl, pentyl, hexyl, heptyl, octyl and benzyl (bonded via methyl group), or —NR'R' forms a morpholine group, pyrrolidine group, piperidine group, C1-C6 alkylpiperazine or oxazolidine group; R" is methyl; Ra, Rb and Rc are each hydrogen; and x4=y4=z4=1;

b) (Rd)3 is (methyl, methyl, t-butyl) or (hexyl, hexyl, hexyl); R' is independently selected from methyl and ethyl, or —NR'R' forms a morpholine group, pyrrolidine group, piperidine group, C1-C6 alkylpiperazine or oxazolidine group; R" is methyl; Ra, Rb and Rc are each hydrogen; and x4=2, y4=1 and z4=0;

c) (Rd)3 is (methyl, methyl, t-butyl) or (hexyl, hexyl, hexyl); R' is independently selected from methyl and ethyl, or —NR'R' forms a morpholine group, pyrrolidine group, piperidine, C1-C6 alkylpiperazine group or oxazolidine group; R" is methyl; Ra and Rb are each hydrogen and Rc is vinyl; and x4=y4=z4=1.

Preferred embodiments of the vinylsilane compound of formula (4) are (tert-butyldimethylsiloxy)(piperidinyl)-methyl(vinyl)silane, (tert-butyldimethylsiloxy)-4-(N-methylpiperazinyl)-methyl(vinyl)silane, (tert-butyldimethylsiloxy)-4-(N-ethylpiperazinyl)-methyl(vinyl)silane, (tert-butyldimethylsiloxy-4-(N-propylpiperazinyl)-methyl(vinyl) silane, (tert-butyldimethylsiloxy)-4-(N-butylpiperazinyl)-methyl(vinyl)silane, (tert-butyldimethylsiloxy)-4-(N-hexylpiperazinyl)-methyl(vinyl)silane, (tert-butyldimethylsiloxy)(dibenzylamino)-methyl(vinyl)silane, (tert-butyldimethylsiloxy)(dicyclohexylamino)-methyl(vinyl)silane and/or (tert-butyldimethylsiloxy)(dibutylamino)-methyl(vinyl) silane.

(iv) Vinyl silane according to formula (4a)

In another preferred embodiment, the vinylsilane compound of formula (4) is represented by formula (4a), as defined below.

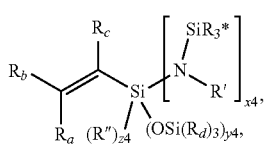

formula (4a)

wherein R* is independently selected from C1-C6 alkyl, C6-C12 aryl and C7-C18 alkylaryl, and the remaining groups and parameters are as defined for formula (4).

Preferred embodiments of the vinylsilane compound of formula (4a) are (tert-butyldimethylsiloxy)[(trimethylsilyl)-propylamino]methyl(vinyl)silane(tert-butyldimethylsiloxy)-[(trimethylsilyl)methylamino]methyl(vinyl)silane, (tert-butyldimethylsiloxy)[(trimethylsilyl)ethylamino]methyl (vinyl)silane, (tert-butyldimethylsiloxy)[(trimethylsilyl)-butylamino]methyl(vinyl)silane, (tert-butyldimethylsiloxy)-[(dimethylphenylsilyl)propylamino]methyl(vinyl)silane, (tert-butyldimethylsiloxy)[(dimethylphenylsilyl)ethyl-amino]methyl(vinyl)silane, and (tert-butyldimethylsiloxy) [(dimethyl-phenylsilyl)methylamino]methyl(vinyl)silane.

Vinylsilane compounds, as described above, are disclosed in more detail in Taiwan (R.O.C.) Patent Application No. 103128797 which is entirely incorporated by reference.

(v) Vinyl silane according to formula (5)

The multivinylaminosilane compound of formula (5) is defined as follows:

(A1)-Bn1    formula (5), wherein A1 is an organic group having at least two amino groups; each B is independently selected from a group —Si(R51)(R52)(R53), wherein R51, R52 and R53 are each independently selected from vinyl, butadienyl, methyl, ethyl, propyl, butyl and phenyl, provided that at least one of R51, R52 and R53 is selected from vinyl and butadienyl, wherein each group B is a substituent of an amino group of group A1, and at least two of the amino groups of group A1 are each substituted with at least one group B; and n1 is an integer of at least 2, preferably an integer selected from 2 to 6; and all amino groups in group A1 are tertiary amino groups.

The multivinylaminosilane of formula (5) has at least two amino groups substituted with at least one ethylenically unsaturated silyl group B. The expression "group B is a substituent of an amino group" or "amino group substituted with a group B" is used herein to describe the bonding of the group B to the nitrogen atom of the amino group, i.e. >N—Si(R51)(R52)(R53). An amino group of group A1 may be substituted with 0, 1 or 2 groups B. All amino groups of group A1 are tertiary amino groups, i.e. amino groups carrying no hydrogen atom. The organic group A1 is preferably a group having no polymerization hydrogens. The expression "polymerization hydrogen" is used in the context of the present invention to designate a hydrogen atom which is not inert, i.e. will react, in an anionic polymerization of conjugated dienes, such as butadiene or isoprene. The organic group A1 is also preferably a group having no electrophilic groups. The expression "electrophilic groups" is used in the context of the present invention to designate a group which will react with n-butyllithium as a model initiator and/or with the living chain in an anionic polymerization of conjugated dienes, such as butadiene or isoprene. Electrophilic groups include: alkynes, (carbo)cations, halogen atoms, Si—O, Si—S, Si-halogen groups, metal-C-groups, nitriles, (thio)-carboxylates, (thio)carboxylic esters, (thio)anhydrides, (thio)ketones, (thio)aldehydes, (thio)cyanates, (thio)-isocyanates, alcohols, thiols, (thio)sulfates, sulfonates, sulfamates, sulfones, sulfoxides, imines, thioketals, thioacetals, oximes, carbazones, carbodiimides, ureas, urethanes, diazonium salts, carbamates, amides, nitrones, nitro groups, nitrosamines, xanthogenates, phosphanes, phosphates, phosphines, phosphonates, boronic acids, boronic esters, etc.

More preferably, the organic group A1 is a group having neither polymerization hydrogens nor electrophilic groups.

In preferred embodiments, the multivinylaminosilane of formula (5) is selected from the following compounds:

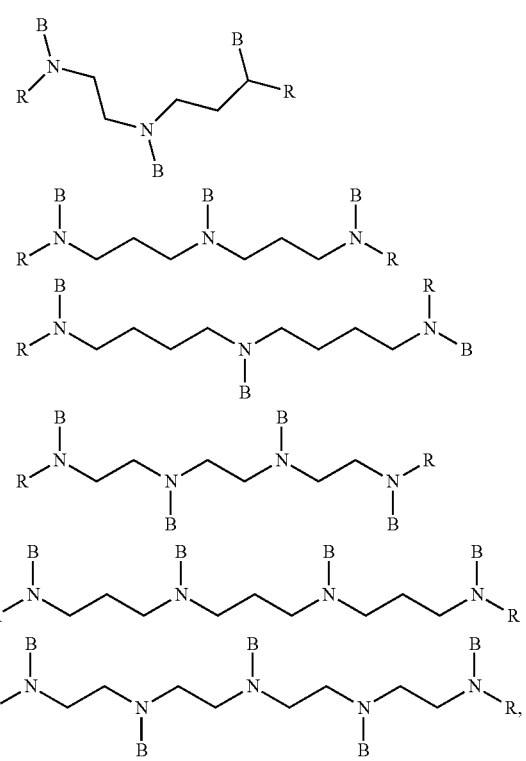

wherein each R is independently selected from B and C1-C6 alkyl, or benzyl, and the same limitations and provisos of formula (5) apply as regards the group B.

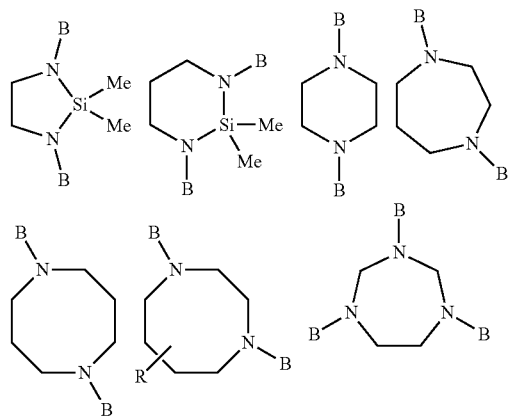

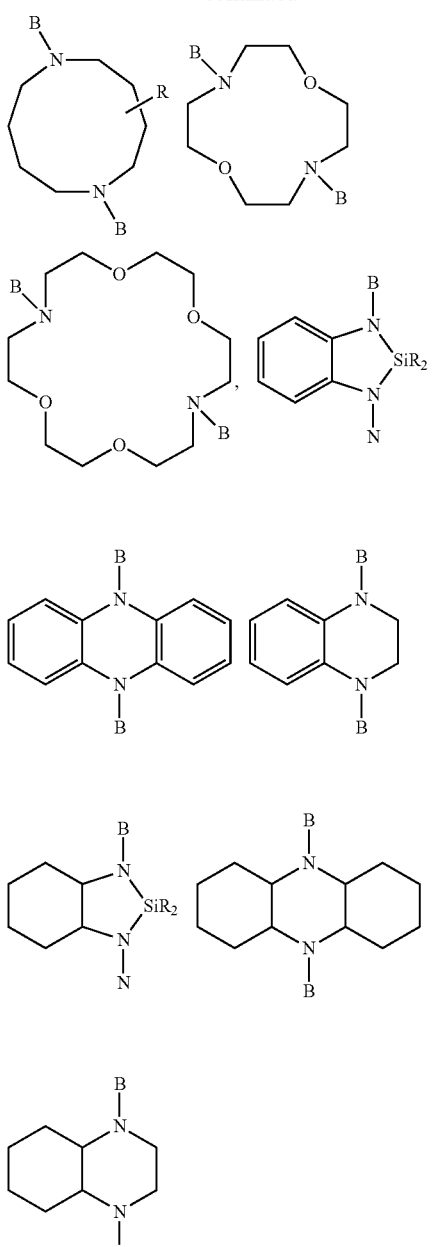
wherein R is a C1-C6 alkyl group, and the same limitations and provisos of formula (5) apply as regards the group B.
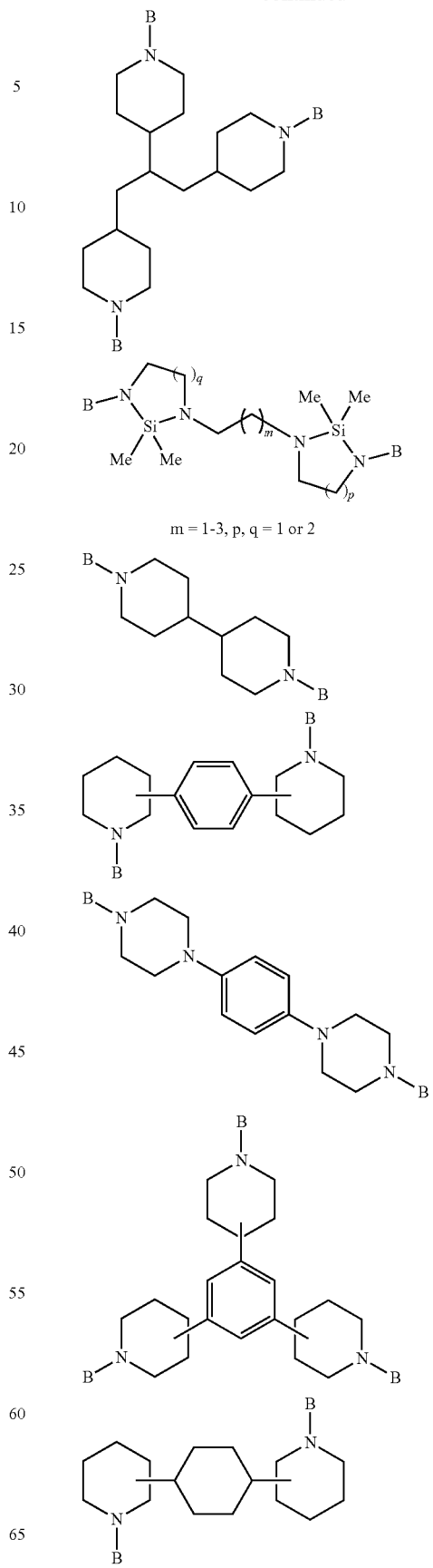
$m = 1\text{-}3, p, q = 1 \text{ or } 2$ -continued

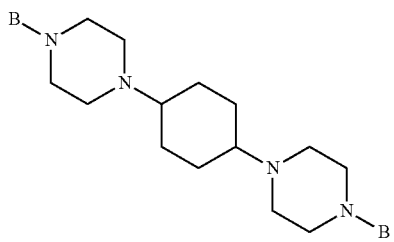

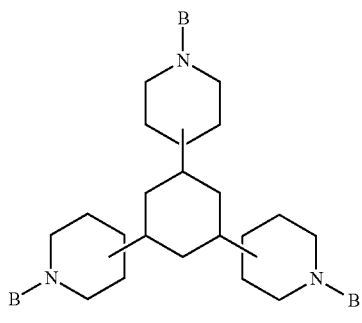

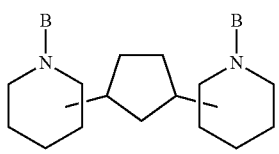

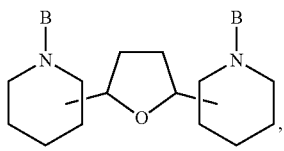

wherein the same limitations and provisos of formula (5) apply as regards the group B.

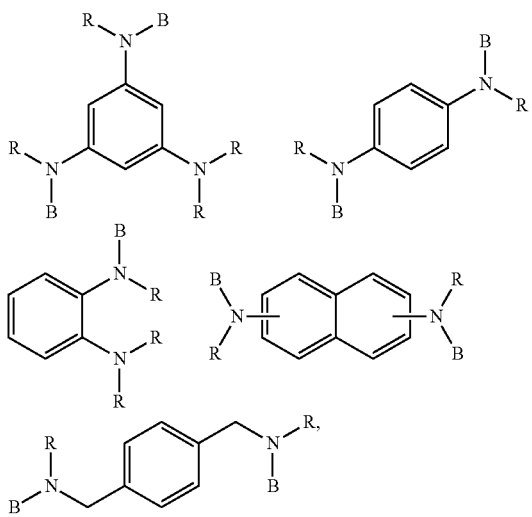

wherein each R is independently selected from B, C1-C4 alkyl and phenyl, and the same limitations and provisos of formula (5) apply as regards the group B.

(v) vinyl silane according to formula (2)

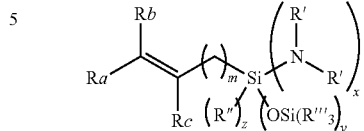

(Formula 2)

wherein

R' is independently selected from $C_1$-$C_{12}$ alkyl, $C_2$-$C_{12}$ alkenyl, $C_6$-$C_{18}$ aryl and $C_7$-$C_{18}$ alkylaryl, wherein the two R' groups may be connected to form a ring and the ring may contain, further to the Si-bonded nitrogen atom, one or more of an oxygen atom, a nitrogen atom, an >N($C_1$-$C_6$ alkyl, $C_6$-$C_{18}$ aryl, $C_7$-$C_{18}$ alkylaryl) group and a sulfur atom;

R" is selected from $C_1$-$C_6$ hydrocarbyl;

R'" is independently selected from $C_1$-$C_{18}$ hydrocarbyl;

$R_a$, $R_b$ and $R_c$ are independently selected from hydrogen, methyl, ethyl and vinyl;

x is an integer selected from 1 and 2; y is an integer selected from 0, 1 and 2; z is an integer selected from 0, 1 and 2; and x+y+z=3;

m is selected from 0 and 1; with the proviso that, when none of $R_a$, $R_b$ and $R_c$ is vinyl, then m=0.

Preferred examples of the alpha olefin monomers are selected from the group of vinyl aromatic and vinyl silane monomers. Preferred examples of secondary amino protecting groups of vinyl silanes of formula (IV), (IA), (IB), (4), (2) include 'safe' amines as defined in patent DE3243141C2.

If used as the optional component in the present method, these monomers are polymerized together with the at least one conjugated diene monomer to give a mixture comprising a living high molecular weight polydiene polymer or copolymer. This first portion of monomers can be added completely at the beginning together with the solvent and the optionally polar agent or can alternatively be added in several portions during the polymerization stage (i) to obtain a defined structure and composition of the high molecular weight polymer chains.

Optionally, this living polydiene polymer and copolymer is then reacted with a coupling agent to obtain a mixture comprising living and coupled high molecular weight polymer fractions. The term "polymer" as used throughout the entire specification and the claims, therefore, covers both, polymers and copolymers, depending on the monomers provided during the polymerization procedure. Accordingly, the term "high molecular weight polydiene (A)" as well as the expression "low molecular weight polydiene (B)" and similar terms including the reference to high molecular weight and low molecular weight components refer to polymers such as homopolymers, copolymers including, for example, terpolymers of the at least one conjugated diene monomer and, e.g. styrene and/or divinylbenzene and other monomers, depending on the monomers employed during the different stages of the present polymerization step.

The step of polymerizing the at least one conjugated diene monomer and, optionally, the one or more alpha olefin monomers, including aromatic vinyl monomers and vinyl silane monomers, further comprises (ii) a second stage of adding to the mixture of stage (i) a second portion of one or more polymerization initiator(s) as well as a second portion of the at least one conjugated diene monomer and, optionally, of the one or more alpha olefin monomers, including aromatic vinyl monomers and vinyl silane monomers, as well as, optionally, a polar agent;

and polymerizing to obtain a blend comprising a high molecular weight polydiene (A), and a low molecular weight polydiene (B); and optionally (iii) a third stage of adding to the blend obtained in stage (ii) at least one chain end modifying compound to obtain a blend comprising a chain end modified high molecular weight polydiene (A), and a chain-end modified low molecular weight polydiene (B).

In a preferred embodiment of the invention, the method described herein is carried out in at least three stages and, therefore, includes the stage (iii) of adding to the blend obtained in stage (ii) at least one chain end modifying compound to obtain a blend comprising a chain end modified high molecular weight polydiene (A) and a chain end modified low molecular weight polydiene (B).

In a preferred embodiment of the present invention, the at least one chain end modifying compound is selected form the group of compounds represented by any of the following Formulas 7, 8, 9, 10, 11, 12, 13, 14, 15, and 16 and Lewis base adducts thereof:

$$(R^{30})_e Si(OR^{29})_f \qquad \text{Formula 7}$$

wherein Si is a silicon atom;
$R^{29}$ is independently selected from $(C_1\text{-}C_4)$ alkyl, $(C_6\text{-}C_{18})$ aryl and $(C_7\text{-}C_{18})$ alkylaryl;
$R^{30}$ is independently selected from $(C_1\text{-}C_{18})$ alkyl, $(C_6\text{-}C_{18})$ aryl, $(C_7\text{-}C_{18})$ alkylaryl and $R^{34}\text{—}(C_2H_4O)_g\text{—}O\text{—}$, wherein $R^{34}$ is selected from $(C_5\text{-}C_{23})$ alkyl, $(C_5\text{-}C_{23})$ alkoxy, $(C_6\text{-}C_{18})$ aryl and $(C_7\text{-}C_{25})$ alkylaryl and e is selected from 0, 1 and 2; f is selected from 1, 2, 3 and 4; and e+f=4;

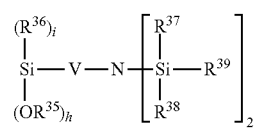

Formula 8 wherein $M^3$ is a silicon atom or a tin atom;
T is at least divalent and is selected from $(C_6\text{-}C_{18})$ aryl, $(C_7\text{-}C_{18})$ alkylaryl and $(C_1\text{-}C_{18})$ alkyl, wherein each group is optionally substituted with one or more groups selected from di$(C_1\text{-}C_7$ hydrocarbyl)amino, bis(tri$(C_1\text{-}C_{12}$ alkyl)silyl)amino, tris$(C_1\text{-}C_7$ hydrocarbyl)silyl, $(C_7\text{-}C_{18})$ alkylaryl and $(C_6\text{-}C_{18})$ aryl;
$R^{23}$ and $R^{26}$ are each independently selected from $(C_1\text{-}C_4)$ alkyl;
$R_{24}$, $R_{25}$, $R_{27}$ and $R_{28}$ are each independently selected from $(C_1\text{-}C_{18})$ alkyl, $(C_6\text{-}C_{18})$ aryl and $(C_7\text{-}C_{18})$ alkylaryl;
a and c are each independently selected from 0, 1 and 2; b and d are each independently selected from 1, 2 and 3; a+b=3; and c+d=3;

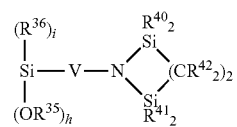

Formula 9 wherein $M^4$ is a silicon atom or a tin atom;
U is at least divalent and is selected from $(C_6\text{-}C_{18})$ aryl, $(C_7\text{-}C_{18})$ alkylaryl and $(C_1\text{-}C_{18})$ alkyl, wherein each group is optionally substituted with one or more groups selected from di$(C_1\text{-}C_7$ hydrocarbyl)amino, bis(tri$(C_1\text{-}C_{12}$ alkyl)silyl)amino, tris$(C_1\text{-}C_7$ hydrocarbyl)silyl, $(C_7\text{-}C_{18})$ alkylaryl and $(C_6\text{-}C_{18})$ aryl;
$R^{29}$ is independently selected from $(C_1\text{-}C_4)$ alkyl, $(C_6\text{-}C_{18})$ aryl and $(C_7\text{-}C_{18})$ alkylaryl;
$R^{31}$, $R^{32}$ and $R^{33}$ are each independently selected from $(C_1\text{-}C_{18})$ alkyl, $(C_1\text{-}C_{18})$ alkoxy, $(C_6\text{-}C_{18})$ aryl and $(C_7\text{-}C_{18})$ alkylaryl;
$R^{30}$ is independently selected from $(C_1\text{-}C_{18})$ alkyl, $(C_6\text{-}C_{18})$ aryl, $(C_7\text{-}C_{18})$ alkylaryl and $R^{34}\text{—}(C_2H_4O)_g\text{—}O\text{—}$, wherein $R^{34}$ is selected from $(C_5\text{-}C_{23})$ alkyl, $(C_5\text{-}C_{23})$ alkoxy, $(C_6\text{-}C_{18})$ aryl and $(C_7\text{-}C_{25})$ alkylaryl and g is selected from 4, 5 and 6;
e is selected from 0, 1 and 2; f is selected from 1, 2 and 3; and e+f=3;

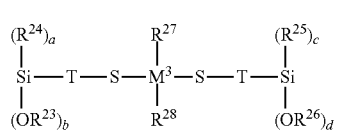

Formula 10

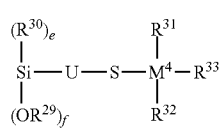

Formula 11 wherein V is at least divalent and is selected from $(C_6\text{-}C_{18})$ aryl, $(C_7\text{-}C_{18})$ alkylaryl and $(C_1\text{-}C_{18})$ alkyl, wherein each group is optionally substituted with one or more groups selected from di$(C_1\text{-}C_7$ hydrocarbyl)amino, bis(tri$(C_1\text{-}C_{12}$ alkyl)silyl)amino, tris$(C_1\text{-}C_7$ hydrocarbyl)silyl, $(C_7\text{-}C_{18})$ alkylaryl and $(C_6\text{-}C_{18})$ aryl;
$R^{35}$ is independently selected from $(C_1\text{-}C_4)$ alkyl, $(C_6\text{-}C_{18})$ aryl and $(C_7\text{-}C_{18})$ alkylaryl;
$R^{37}$, $R^{38}$, $R^{39}$, $R^{40}$, $R^{41}$ and $R^{42}$ are each independently selected from $(C_1\text{-}C_{18})$ alkyl, $(C_1\text{-}C_{18})$ alkoxy, $(C_6\text{-}C_{18})$ aryl and $(C_7\text{-}C_{18})$ alkylaryl;
$R^{36}$ is independently selected from $(C_1\text{-}C_{18})$ alkyl, $(C_1\text{-}C_{18})$ alkoxy, $(C_6\text{-}C_{18})$ aryl, $(C_7\text{-}C_{18})$ alkylaryl and $R^{43}\text{—}(C_2H_4O)_j\text{—}O\text{—}$, wherein $R^{43}$ is selected from $(C_5\text{-}C_{23})$ alkyl, $(C_5\text{-}C_{23})$ alkoxy, $(C_6\text{-}C_{18})$ aryl and $(C_7\text{-}C_{25})$ alkylaryl; and j is selected from the 4, 5 and 6;
i is selected from 0, 1 and 2; h is selected from 1, 2 and 3; and i+h=3;

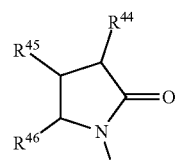

Formula 12

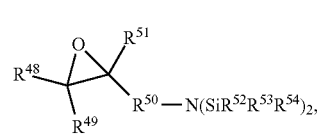

Formula 13 wherein $R^{44}$, $R^{45}$, $R^{46}$, $R^{47}$, $R^{48}$, $R^{49}$, $R^{51}$, $R^{52}$, $R^{53}$ and $R^{54}$ are each independently selected from hydrogen, $(C_1\text{-}C_{16})$ alkyl, $(C_6\text{-}C_{16})$ aryl and $(C_7\text{-}C_{16})$ alkylaryl; and $R^{50}$ is at least divalent and is selected from ($C_6$-$C_{18}$) aryl, ($C_7$-$C_{18}$) alkylaryl and ($C_1$-$C_{18}$) alkyl, wherein each group is optionally substituted with one or more groups selected from di($C_1$-$C_7$ hydrocarbyl)amino, bis(tri($C_1$-$C_{12}$ alkyl)silyl) amino, tris($C_1$-$C_7$ hydrocarbyl)silyl, ($C_7$-$C_{18}$) alkylaryl and ($C_6$-$C_{18}$) aryl.

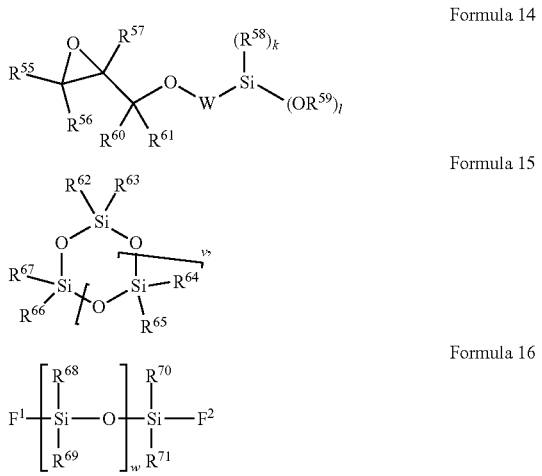

Formula 14

Formula 15

Formula 16

In Formulas 14, 15 and 16 $R^{55}$, $R^{56}$, $R^{57}$, $R^{58}$, $R^{60}$, $R^{61}$, $R^{62}$, $R^{63}$, $R^{64}$, $R^{65}$, $R^{66}$, $R^{67}$, $R^{68}$, $R^{69}$, $R^{79}$ and $R^{71}$ are each independently selected from hydrogen, ($C_1$-$C_{16}$) alkyl, ($C_6$-$C_{16}$) aryl and ($C_7$-$C_{16}$) alkylaryl;
$R^{59}$ is selected from ($C_1$-$C_4$) alkyl, ($C_6$-$C_{18}$) aryl and ($C_7$-$C_{18}$) alkylaryl;
W is at least divalent and is selected from ($C_6$-$C_{18}$) aryl, ($C_7$-$C_{18}$) alkylaryl and ($C_1$-$C_{18}$) alkyl, wherein each group is optionally substituted with one or more groups selected from di($C_1$-$C_7$ hydrocarbyl)amino, bis(tri($C_1$-$C_{12}$ alkyl)silyl) amino, tris($C_1$-$C_7$ hydrocarbyl)silyl, ($C_7$-$C_{18}$) alkylaryl and ($C_6$-$C_{18}$) aryl;
k is selected from 0, 1 and 2; l is selected from 1, 2 and 3; k+l=3; and v is selected from 1 to 20;
$F^1$ and $F^2$ are independently selected from hydrogen, hydroxy, chlorine, bromine, iodine, —$SiR^{52}R^{53}R^{54}$, wherein $R^{52}$, $R^{53}$, $R^{54}$ are the same or different and are as defined for Formulas 12 and 13, vinyl, ($C_6$-$C_{16}$) aryl, ($C_7$-$C_{16}$) alkylaryl and ($C_1$-$C_{16}$) alkyl, wherein each hydrocarbyl group is optionally substituted with one or more groups selected from hydroxyl, di($C_1$-$C_7$ hydrocarbyl)amino, bis(tri ($C_1$-$C_{12}$ alkyl)silyl)amino and an epoxy group.

The modifying compound is used in molar ratios of between 0.4 to 1.5 mole, most preferably between 0.7 and 1.3 mole per total mole of initiator(s). A certain portion of coupled low molecular weight polymer beside the targeted modified low molecular weight polymer is obtained as side product at use of a lower than an equimolar ratio of modifying agent to the total moles of initiator(s).

The best rolling resistance performance and the lowest HBU will be obtained the higher the molar ratio of modifying agent to total initiator is and the lower the portion of coupled low molecular weight polymer fraction in the inventive blend is.

Accordingly in one preferred embodiment the modifying compound may be used in stoichiometric excess to the total amount of applied initiator (ratio 0.95-1.2 mole per total mole of initiator) used for making the polymer.

The polymerization initiator that is used in the present method is preferably a polymerization initiator comprising an organolithium compound, preferably an organolithium compound that is selected from methyllithium, ethyllithium, n-butyllithium, s-butyllithium, t-butyllithium, t-octyllithium, isopropyllithium, phenyllithium, cyclohexyllithium, 2-butyllithium, 4-phenylbutyllithium, a compound according to Formula x, Formula y and Formula z

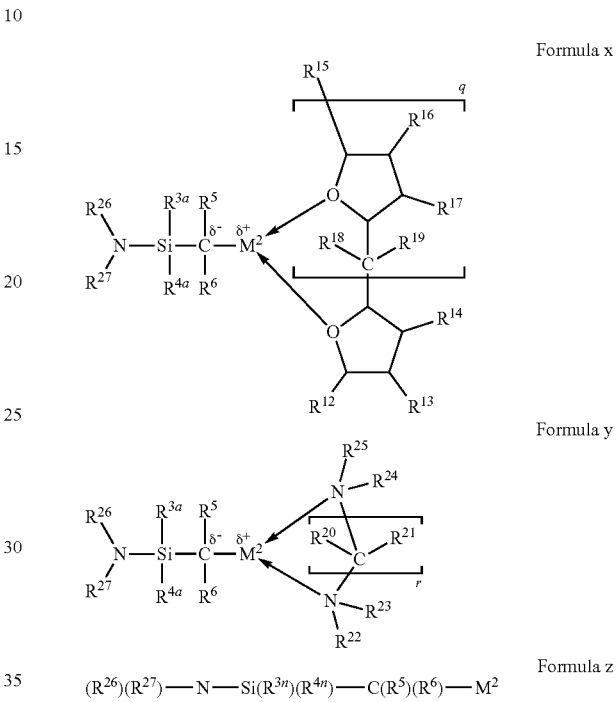

Formula x

Formula y

Formula z $(R^{26})(R^{27})$—N—$Si(R^{3n})(R^{4n})$—$C(R^5)(R^6)$—$M^2$ or Lewis base adducts thereof,
wherein
$M^2$ is lithium, sodium or potassium;
O is an oxygen atom; Si is a silicon atom; C is a carbon atom; N is a nitrogen atom;
$R^{3a}$ is selected from —$N(R^{28})R^{29}$ and ($C_1$-$C_{18}$) alkyl;
$R^{4a}$ is selected from —$N(R^{30})R^{31}$, ($C_1$-$C_{18}$) alkyl, ($C_6$-$C_{18}$) aryl and ($C_7$-$C_{18}$) aralkyl;
$R^5$, $R^6$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$ and $R^{25}$ are each independently selected from hydrogen, ($C_1$-$C_{18}$) alkyl, ($C_6$-$C_{18}$) aryl and ($C_7$-$C_{18}$) aralkyl; $R^{26}$, $R^{27}$, $R^{28}$, $R^{29}$, $R^{30}$ and $R^{31}$ are each independently selected from ($C_1$-$C_{18}$) alkyl, ($C_6$-$C_{18}$) aryl and ($C_7$-$C_{18}$) aralkyl;
r is selected from an integer of 1, 2 and 3;
q is selected from an integer of 1, 2, 3, 4 and 5;
t-butyldimethylsilyloxypropyllithium, dialkylaminopropyllithium, N-morpholinopropyllithium, sodium biphenylide, sodium naphthalenide, potassium naphthalenide, 1,3-bis(1-(phenyl)1-lithiohexyl)benzene, 1,3-bis(1-(4-ethylphenyl)1-lithiohexyl)benzene, 1,3-bis(1-(4-methylphenyl)1-lithiohexyl)benzene, 1,3-bis(1-(4-propylphenyl)1-lithiohexyl) benzene,1,3-bis(1-(4-(tert-butyl)phenyl)1-lithiohexyl)-benzene, 1,3-bis(1-(4-(diethylamino)phenyl)1-lithiohexyl) benzene, 1,3-bis(1-(4-(dimethylamino)phenyl)1-lithiohexyl)benzene,1,3-bis(1-(4-ethoxyphenyl)1-lithiohexyl)benzene, 1,3-bis(1-(4-(dimethoxy)phenyl)1-lithiohexyl)benzene, (((dimethylamino)dimethylsilyl)methyl)lithium, (((diethylamino)dimethylsilyl)methyl)lithium, (((dibutylamino) dimethylsilyl)methyl)lithium, (((dihexylamino)

dimethylsilyl)methyl)lithium, (((dioctylamino) dimethylsilyl)methyl)lithium, (((dibenzylamino) dimethylsilyl)methyl)lithium, ((dimethyl(piperidin-1-yl) silyl)methyl)lithium, ((dimethyl(morpholino)silyl)methyl) lithium, ((dimethyl(4-methylpiperazin-1-yl)silyl)methyl) lithium, ((dimethyl(4-ethylpiperazin-1-yl)silyl)methyl) lithium, and ((dimethyl(4-benzylpiperazin-1-yl)silyl) methyl)lithium or a combination of any two or more of these organolithium compounds.

When the method of the present invention involves the use of a polar agent, the polar agent preferably comprises one or more ether compounds and/or one or more tertiary amine compounds. Preferably, the ether compound is selected from the group consisting of: diethyl ether, di-n-butyl ether, ethylene glycol diethyl ether, ethylene glycol dibutylether, diethylene glycol dimethyl ether, propylene glycol dimethyl ether, propylene glycol diethyl ether, propylene glycol dibutylether, alkyltetrahydrofurylethers, such as, methyltetrahydrofurylether, ethyltetrahydro-furylether, propyltetrahydrofurylether, butyltetrahydrofurylether, hexyltetrahydro-furylether, octyltetrahydrofurylether, tetrahydrofuran, 2,2-(bistetrahydro-furfuryl)propane, bistetrahydrofurfurylformal, methyl ether of tetrahydrofurfuryl alcohol, ethyl ether of tetrahydrofurfuryl alcohol, butyl ether of tetrahydrofurfuryl alcohol, α-methoxytetrahydrofuran, dimethoxybenzene, and dimethoxyethane. Preferred examples of the tertiary amine compounds are selected from the group consisting of: butyl ether of triethylamine, pyridine, N,N,N',N'-tetramethyl ethylenediamine, dipiperidinoethane, methyl ether of N,N-diethylethanolamine, ethyl ether of N,N-diethylethanolamine, and N,N-diethylethanolamine, oligomeric oxolanyl alkanes, preferably N,N,N', N'-tetramethyl ethylenediamine and 2,2-(bistetrahydro-furfuryl)propane.

The organic solvent that is provided in the step of polymerizing the at least one conjugated diene monomer and, optionally, the one or more alpha olefin monomers is preferably selected from the group consisting of cyclohexane, butane, butene, hexane and heptane or mixtures thereof.

As described herein, the first stage (ii) of the step of polymerizing the at least one conjugated diene monomer and, optionally, one or more alpha olefin monomers optionally comprises the addition of a coupling agent to and its reaction with the living high molecular weight polydiene monomer or copolymer obtained in stage (ii). Exemplary coupling agents are described in U.S. Pat. Nos. 3,281,383, 3,244,664 and 3,692,874 (e.g., tetrachlorosilane); U.S. Pat. Nos. 3,978,103 and 6,777,569 (blocked mercaptosilanes); U.S. Pat. No. 3,078,254 (multi-halogen-substituted hydrocarbon, such as 1,3,5-tri(bromo methyl) benzene); U.S. Pat. No. 4,616,069 (tin compound and organic amino or amine compound); and US 2005/0124740. Preferably, this coupling agent is selected from the group consisting of tin halides, silicon halides, tin alkoxides, and silicon alkoxides and blocked mercaptosilanes such as $SnCl_4$, $(R_1)_3SnCl$, $(R_1)_2SnCl_2$, $R_1SnCl_3$, $SiCl_4$, $R_1SiCl_3$, $(R_1)_2SiCl_2$, $(R_1)_3SiCl$, $Cl_3Si-SiCl_3$, $Cl_3Si-O-SiCl_3$, $Cl_3Sn-SnCl_3$ and $Cl_3Sn-O-SnCl_3$ wherein $R_1$ is a hydrocarbyl group, preferably an alkyl group; $Sn(OMe)_4$, $Si(OMe)_4$, $Sn(OEt)_4$ and $Si(OEt)_4$. In a most preferred embodiment, a coupling agents is selected from the group consisting of $SnCl_4$, $SiCl_4$, $Sn(OMe)_4$ and $Si(OMe)_4$.

Generally, the coupling agent can be added before the second stage dosing of initiator or after the second stage dosing of initiator and before the addition of the modification agent and the modification reaction is preferably carried out after the addition of the coupling agent. More preferably, the coupling agent is added after the first stage dosing of initiator.

The coupling agent is used in a molar ratio to the portion of the one or more initiator(s) used in stage (i) to end up with a portion of coupled high molecular polymer chains between 5 to 90 mass percent of the total portion of high molecular polymer chains, preferred 10 to 80%, most preferred 20 to 70%.

Typically, the polymerization of the at least one conjugated diene monomer and, optionally, the one or more alpha olefin monomers, including aromatic vinyl monomers and vinyl silane monomers is carried out at a temperature above 0° C. In a preferred embodiment, the temperature of the polymerization is in the range of from 10-100° C., more preferably in a range of from 20 to 90° C., most preferably in the range of from 30 to 80° C.

The step of polymerizing that forms part of the method described herein comprises a first stage (i) wherein the monomers provided are polymerized up to a conversion rate of at least 95% to obtain a mixture comprising a living high molecular weight polydiene polymer or copolymer. The term "up to a conversion rate of at least 95%" or similar expressions relates to the conversion based on the amounts of monomers provided in stage (i). In a preferred embodiment, the conversion rate in the first stage (i) is more than 95%, preferably more than 98% and most preferably more than 99%.

The second stage (ii) of adding to the mixture of stage (i) a second portion of one or more polymerization initiator(s) as well as a second portion of the at least one conjugated diene monomer and, optionally, of the one or more alpha olefin monomers, including aromatic vinyl monomers and vinyl silane monomers, as well as the polar agent is carried out up to complete conversion of monomers present in this stage. Complete conversion in stage (ii) in the context of the present invention refers to a maximum residual monomer content of 500 ppm, preferred 250 ppm and most preferred 50 ppm based on the total weight of the reaction mixture.

The second portion of initiator(s) added in step (ii) may be of the same or different chemical structure than of the initiator(s) added in step (i).

Conducting the step of polymerizing in two stages (i) and (ii) as described herein allows the provision of a high molecular weight polydiene (A) and a low molecular weight polydiene (B) in the form of an in-situ blend. Without wishing to be bound by any particular theory, the inventors believe that the improved performance properties that are observed with this blend when used for the preparation of, e.g. tires is the result of both, the specific polymer structure of the individual polymers and the very intimate mixture that cannot be provided by means of a mere physical mixing procedure. The polymer chains of the low molecular weight component are formed while the relatively long and heavy polymer chains of the high molecular weight component already exist. The distribution of the very small initiator molecules in the solution and of the resulting low molecular chains after stage (ii) between the high molecular polymer chains is quite better/more uniform compared with a distribution achievable by physical mixing of a solution of high molecular polymers of a very high viscosity with the solution of a low molecular polymer of a significant lower viscosity. Further, the monomers used in the stage (ii) are not only polymerizing with the new added initiator to the low molecular polymer (B) but also react with the available high molecular polymer chains. This may help to further improve the compatibility/miscibility of the resulting high molecular polymer (A) with the low molecular polymer (B).

In a preferred embodiment of the present invention, the relative amounts of the first and the second portion of the at least one conjugated diene monomer and, optionally, of the one or more alpha olefin monomers, including aromatic vinyl monomers and vinyl silane monomers, provided in the first and in the second stages are as follows:

$1^{st}$ portion monomer is of from 0.93-0.5; preferably of from 0.91-0.6 and most preferably from 0.9-0.73;
$2^{nd}$ portion monomer is from 0.5-0.07; preferably of from 0.4-0.09 and most preferably from 0.1-0.27, based on a total amount of ($1^{st}$ portion monomer+$2^{nd}$ portion monomer)=1.

In a further preferred embodiment of the present invention, the ratio of the first and of the second portion of the polymerization initiator based on the total amount of initiator moles provided in the first and in the second stage is defined as:

$1^{st}$ portion initiator is of from 0.033-86.9 mole % and $2^{nd}$ portion initiator is of from 99.967-13.1 mole %.

By adjusting the ratio of the first and the second portion of the polymerization initiators to the above range, it is possible to prepare polymers of relatively high molecular weight during stage (i) and polymers of relatively low molecular weight in stage (ii). Preferably, the ratio of the first and of the second portion of the polymerization initiator is for the $1^{st}$ portion initiator from 0.26 to 50 mole % and the second portion of the initiator from 50 to 99.74 mol % of the total used amount of polymerization initiators.

In a further preferred embodiment, the method of the present invention preferably comprises a fourth stage (iv) of adding and reacting a polymer chain terminating agent and one or more antioxidants and removing the solvent from the blend obtained in stage (ii) or stage (iii).

As described herein above, it was found that the method as described herein allows the provision of a synthetic rubber blend that is of particular value when used to manufacture articles such as tires.

In a second aspect, the invention therefore also relates to a synthetic rubber blend obtainable according to the method described herein.

In a preferred embodiment, the synthetic rubber blend comprises
(a) 50-93 parts by weight of a high molecular weight polydiene (A); and
(b) 7-50 Parts by weight of a low molecular weight polydiene (B).

In one embodiment the synthetic rubber blend comprises 50-65 parts by weight of a high molecular weight polydiene (A); and 50-35 Parts by weight of a low molecular weight polydiene (B). Such blends are especially preferred if very low levels of damping at elevated temperature are required to achieve special performance parameters like e.g. outstanding HBU and rolling resistance properties needed especially for high performance tires. In addition, the high loading of in situ polymerized polymer oils contribute to significantly improved snow grip properties by means of low dynamic stiffness at temperatures in the subzero range.

In another embodiment the synthetic rubber blend comprises 65-75 parts by weight of a high molecular weight polydiene (A); and 35-25 Parts by weight of a low molecular weight polydiene (B). Such blends are preferred if very good rolling resistance performance is required upon retention of acceptable snow grip properties for winter application. Compared to the former example, the higher portion of high molecular weight polydiene contributes to a higher level of dynamic stiffness at elevated temperatures and therefore to improved dry handling properties needed e.g. for ultrahigh-performance and racing tires. The contribution to snow grip improvement still remains clearly noteworthy.

In a preferred embodiment the synthetic rubber blend comprises 75-90 parts by weight of a high molecular weight polydiene (A); and 25-10 Parts by weight of a low molecular weight polydiene (B). Such blends are preferred if even higher levels of dynamic stiffness @ elevated temperatures are required to achieve even higher levels of dry handling indication at an acceptable level of HBU and rolling resistance properties.

In a particularly preferred embodiment, the polydiene (A) of the synthetic rubber blend that is described herein has a weight average molecular weight (Mw) of from 500-3000 kg/mol, preferably of from 600-2500 kg/mol, most preferably of from 700-2000 kg/mol. Further preferably, the low molecular weight polydiene (B) has a weight average molecular weight (Mw) of from 0.5 to 100 kg/mol, more preferably of from 2-80 kg/mol, most preferably of from 5-50 kg/mol.

In a preferred embodiment of the invention, the synthetic rubber blend has a single glass transition temperature. This feature guarantees that the blend acts versus other ingredients in the compound as if being only one single rubber. Otherwise, the compatibility of the low molecular weight polymer (B) with another rubber in the compound could be different compared with the compatibility of the high molecular polymer (A) with this other rubber and cause inhomogeneity in the compound as well as in the vulcanizates resulting in a worsening of the performance especially the rolling resistance performance.

In a further preferred embodiment, the synthetic rubber blend comprising the high molecular weight polydiene (A) and the low molecular weight polydiene (B) has a mooney viscosity that is in the range of from 30-100 MU, preferred 40-85, more preferred 45-75 MU.

In a further preferred embodiment, the synthetic rubber blend comprising the high molecular weight polydiene (A) and the low molecular weight polydiene (B) is characterized by a polydispersity Mw/Mn in the range of 3-150.

In one preferred embodiment the synthetic rubber blend comprising the high molecular weight polydiene (A) and the low molecular weight polydiene (B) is characterized by a polydispersity Mw/Mn in the range of 5-30. In another embodiment, especially for the use in racing and ultrahigh performance tires, the synthetic rubber blend comprising the high molecular weight polydiene (A) and the low molecular weight polydiene (B) is characterized by a polydispersity Mw/Mn in the range of 50-120.

Typical examples of the present invention are carried out with mixtures of the at least one conjugated diene monomer and one or more alpha olefin monomers. As discussed herein, first and second portions of the at least one conjugated diene monomer and the one or more alpha olefin monomers are provided in the first and the second stage, respectively. When the first and/or the second stage involve one or more alpha olefin monomers, the relative amount of the at least one conjugated diene monomer and the one or more alpha olefin monomers may be 5 to 98 weight percent of conjugated diene monomer and 95 to 2 weight percent of one or more alpha olefin monomer; for example, the relative amount may be 30 to 95 percent conjugated monomer and 70 to 5 percent alpha olefin monomers, preferably 40 to 95 weight percent conjugated diene monomer and 5 to 60 percent alpha olefin monomers. Preferred typical amounts of alpha olefin monomer range from 0 to 70 weight percent, preferably from 0 to 50 weight percent, even more preferably of from 10 to 25 weight percent based on the amount of the at least one conjugated diene monomer and the one or more alpha olefin monomers that are provided and polymerized in the first and/or the second stage.

In a further aspect, the present invention relates to rubber compositions comprising the blend that is described herein. Such a rubber composition may further comprise one or more additional rubber components that can be selected from the group consisting of styrene butadiene rubber, butadiene rubber, synthetic isoprene rubber and natural rubber.

In a particularly preferred embodiment of this aspect of the invention, the rubber composition further comprises filler. Examples of suitable fillers include, without limitation, carbon black (including electroconductive carbon black), carbon nanotubes (CNT) (including discrete CNT, hollow carbon fibers (HCF) and modified CNT carrying one or more functional groups, such as hydroxyl, carboxyl and carbonyl groups) graphite, graphene (including discrete graphene platelets), silica, carbon-silica dual-phase filler, clays including layered silicates, calcium carbonate, magnesium carbonate, lignin, amorphous fillers, such as glass particle-based fillers, starch-based fillers, and combinations thereof. Further examples of suitable fillers are described in WO 2009/148932 which is incorporated herein by reference in its entirety.

Examples of suitable carbon black include, without limitation, the one conventionally manufactured by a furnace method, for example having a nitrogen adsorption specific surface area of 50-200 $m^2/g$ and DBP oil absorption of 80-200 mL/100 grams, such as carbon black of the FEF, HAF, ISAF or SAF class, and electroconductive carbon black. In some embodiments, high agglomeration-type carbon black is used. Carbon black is typically used in an amount of from 2 to 100 parts by weight, or 5 to 100 parts by weight, or 10 to 100 parts by weight, or 10 to 95 parts by weight per 100 parts by weight of the total polymer.

Examples of suitable silica fillers include, without limitation, wet process silica, dry process silica and synthetic silicate-type silica. Silica with a small particle diameter and high surface area exhibits a high reinforcing effect. Small diameter, high agglomeration-type silica (i.e. having a large surface area and high oil absorptivity) exhibits excellent dispersibility in the polymer composition, resulting in superior processability. An average particle diameter of silica in terms of the primary particle diameter may be from 5 to 60 nm, more preferably 10 to 35 nm. The specific surface area of the silica particles (measured by the BET method) may be from 35 to 300 $m^2/g$. Silica is typically used in an amount of from 10 to 150 parts by weight, or 30 to 130 parts by weight, or 50 to 130 parts by weight per 100 parts by weight of the total polymer.

While the most preferred filler for the purposes of the present invention is silica, silica fillers can be used in combination with other fillers, including, without limitation, carbon black, carbon nanotubes, carbon-silica dual-phase-filler, graphene, graphite, clay, calcium carbonate, magnesium carbonate and combinations thereof.

Carbon black and silica may be added together, in which case the total amount of carbon black and silica is from 30 to 150 parts by weight or 50 to 150 parts by weight per 100 parts by weight of the total polymer.

Carbon-silica dual-phase filler is so called silica-coated carbon black made by coating silica on the surface of carbon black and commercially available under the trademark CRX2000, CRX2002 or CRX2006 (products of Cabot Co.). Carbon-silica dual-phase filler is added in the same amounts as described above with respect to silica.

A preferred rubber composition according to the present invention comprises:
- 20-150 parts per hundred rubber (phr) of the synthetic rubber blend
- 0-86.7 phr of a different rubber, eg. SSBR, E-SBR, NR, BR, polyisoprene or mixtures thereof
- 20 to 150 phr of silica,
- 0-100 phr CB
- 0-100 phr of softener from the classes of usual process oils, polymer oils, processing aids or mixtures therof In yet another aspect of the present invention, the present disclosure relates to a method for the preparation of a cross-linked rubber composition. This method comprises the step of adding one or more vulcanizing agent to the synthetic rubber blend of the invention or to the rubber composition described herein and cross-linking the composition.

Sulfur, sulfur-containing compounds acting as sulfur-donors, sulfur-accelerator systems, and peroxides are the most common vulcanizing agents. Examples of sulfur-containing compounds acting as sulfur-donors include, but are not limited to, dithiodimorpholine (DTDM), tetramethylthiuramdisulfide (TMTD), tetraethylthiuramdisulfide (TETD), and dipentamethylenthiuramtetrasulfide (DPTT). Examples of sulfur accelerators include, but are not limited to, amine derivatives, guanidine derivatives, aldehydeamine condensation products, thiazoles, thiuram sulfides, dithiocarbamates, and thiophosphates. Examples of peroxides used as vulcanizing agents include, but are not limited to, di-tert.-butyl-peroxides, di-(tert.-butyl-peroxy-trimethyl-cyclohexane), di-(tert.-butyl-peroxy-isopropyl-) benzene, dichloro-benzoylperoxide, dicumylperoxides, tert.-butyl-cumyl-peroxide, dimethyl-di(tert.-butyl-peroxy)hexane and dimethyl-di(tert.-butyl-peroxy)hexine and butyl-di(tert.-butyl-peroxy)valerate (Rubber Handbook, SGF, The Swedish Institution of Rubber Technology 2000). Further examples and additional information regarding vulcanizing agents can be found in Kirk-Othmer, *Encyclopedia of Chemical technology* $3^{rd}$, Ed., (Wiley Interscience, N.Y. 1982), volume 20, pp. 365-468, (specifically "Vulcanizing Agents and Auxiliary Materials" pp. 390-402).

A vulcanizing accelerator of sulfene amide-type, guanidine-type, or thiuram-type may be used together with a vulcanizing agent, as required. Other additives such as zinc white, vulcanization auxiliaries, aging preventives, processing adjuvants, and the like may be optionally added. A vulcanizing agent is typically added to the polymer composition in an amount from 0.5 to 10 parts by weight and, in some preferred embodiments, from 1 to 6 parts by weight for 100 parts by weight of the total elastomeric polymer. Examples of vulcanizing accelerators, and the amount of accelerator added with respect to the total polymer, are given in International Patent Publication No. WO 2009/148932. Sulfur-accelerator systems may or may not comprise zinc oxide. Preferably, zinc oxide is applied as component of the sulfur-accelerator system.

The invention is further directed to a cured rubber composition that is obtainable by the above method that involves the step of crosslinking the compositions discussed herein.

Moreover, the present invention relates to articles, comprising the polymer composition, comprising the polymer blend according to the invention, or said crosslinked elastomeric polymer obtainable according to the above described method. In a preferred embodiment, the article according to the present invention is a tire, a tire tread, a tire side wall, a conveyer belt, a seal or a hose. A particularly preferred article according to the present invention is a tire.

Test Methods

Size Exclusion Chromatography

Molecular weight and molecular weight distribution of the polymer were each measured using size exclusion chromatography (SEC) based on polystyrene standards. Each polymer sample (9 to 11 mg) was dissolved in tetrahydrofuran (10 mL) to form a solution. The solution was filtered using a 0.45-µm filter. A 100-µL sample was fed into a GPC column (Hewlett Packard system 1100 with 3 PLgel 10 µm MIXED-B columns). Refraction Index-detection was used as the detector for analyzing the molecular weight. The molecular weight was calculated as polystyrene based on the calibration with EasiCal PS1 (Easy A and B) Polystyrene standards from Polymer Laboratories. All molecular weight values, e.g. the number-average molecular weight (Mn) figures or the weight-average molecular weight (Mw) figures, are given based on the polystyrene standards. The molecular weight distribution is expressed as the dispersity D=Mw/Mn.

Analysis to Measure Monomer Conversion

Monomer conversion was determined by measuring the solids concentration (TSC) of the polymer solution at the end of the polymerization. The maximum solid content is obtained at 100 wt % conversion of the charged butadiene (mBd) and styrene (mSt) for the final polymer by TSC max=(mBd+mSt)/(mBd+mSt+mpolar agent+mNBL+mcyclohexane)*100%. A sample of polymer solution ranging from about 1 g to about 10 g, depending on the expected monomer conversion, was drawn from the reactor directly into a 200-mL Erlenmeyer flask filled with ethanol (50 mL). The weight of the filled Erlenmeyer flask was determined before sampling ("A") and after sampling ("B"). The precipitated polymer was removed from the ethanol by filtration on a weighted paper filter (Micro-glass fiber paper, ⌀ 90 mm, MUNKTELL, weight "C"), dried at 140° C., using a moisture analyzer HR73 (Mettler-Toledo) until a mass loss of less than 1 mg within 140 seconds was achieved. Finally, a second drying period was performed using switch-off at a mass loss of less than 1 mg within 90 seconds to obtain the final mass "D" of the dry sample on the paper filter. The polymer content in the sample was calculated as TSC=(D−C)/(B−A)*100%. The final monomer conversion was calculated as TSC/TSC max*100%.

Analysis to Measure Monomer Conversion

The residual monomer content was determined by use of head space gas chromatography. The polymer solution is diluted with cyclohexane (Mass ratio 1:10). A part of this diluted sample (25 mg) was injected into a headspace vial and conditioned 10 min for 140° C. After this time a part of the vapor phase was injected into a gas chromatograph where separation and detection take place. Quantification was performed using external standard calibration.

Analytical Conditions:

| | |
|---|---|
| Device: | Agilent 7890 A with Headspace sampler Agilent G 1888 |
| Column | 60 m × 0.32 mm × 1.0 µm PE-1 |
| Carrier gas | H2 3.5 mL/min; constant flow |
| Oven temperature | 40° C (0 min) 8° C/min up to 180° C (0 min) |
| Injection | 250° C. |

Measurement of the Glass (Transition) Temperature $T_g$

The glass transition temperature was determined using a DSC Q2000 device (TA instruments), as described in ISO 11357-2 (1999) under the following conditions:

Weight: about 10-12 mg;
Sample container: standard alumina pans;
Temperature range: (−140 . . . 80°) C.;
Heating rate: 20 K/min;
Cooling rate: free cooling;
Purge gas: 20 ml Ar/min;
Cooling agent: liquid nitrogen;
Evaluation method: inflection method.

Each sample was measured at least once. The measurements contained two heating runs. The 2nd heating run was used to determine the glass transition temperature.

$^1$H-NMR

Vinyl and total styrene content were measured using 1H-NMR, following ISO 21561-2005, using a NMR spectrometer IBRUKER Avance (400 MHz), and a 5-mm dual probe. CDCl3/TMS was used as solvent in a weight ratio of 0.05%: 99.95%.

Mooney Viscosity

Mooney viscosity of the samples was measured according to ASTM_D 1646.

Measurement of Rheological Properties

Measurements of non-vulcanized rheological properties according to ASTM D 5289-95 were made using a rotor-less shear rheometer (MDR 2000 E) to characterize cure characteristics, especially the time to cure (t95). The "t95" times are the respective times required to achieve 95% conversion of the vulcanization reaction.

Vulcanizate Properties

Test pieces were vulcanized by t95 at 160° C. for measurement of DIN abrasion, tensile strength and tan δ, by t95+5 minutes at 160° C. for measurement of hardness and rebound resilience.

Tensile Strength and Moduli

Tensile strength and moduli were measured according to ASTM D 412 on a Zwick Z010.

Abrasion

DIN abrasion was measured according to DIN 53516 (1987-06-01). The larger the value, the lower the wear resistance.

Hardness Shore a and Rebound Resilience

Hardness Shore A (ASTM D 2240) and rebound resilience (ISO 4662) were measured at 0° C., RT and 60° C.

Dynamic Properties

Heat built-up was measured using according to ASTM D 623, method A, on a Doli'Goodrich'-Flexometer.

The loss factor tan δ (also known as "tan d"), E' and E" were determined at −25° C., 0° C. and 60° C. using a dynamic spectrometer Eplexor 150N/500N manufactured by Gabo Qualimeter Testanlagen GmbH (Germany) applying a tension dynamic strain of 1% at a frequency of 2 Hz.

EXAMPLES

The following examples are provided in order to further illustrate the invention and are not to be construed as limitation of the present invention. Room temperature or ambient temperature refers to a temperature of about 20° C. All polymerizations were performed in a nitrogen atmosphere under exclusion of moisture and oxygen.

Preparation of the Inventive Polymers

Inventive Example E1

Dry cyclohexane (19434.7 g) was added to an air-free, nitrogen-purged 40-L stainless steel reactor. 1,3-Butadiene (1135 g), styrene (306 g), and DTHFP (9 mmol) were fed into the reactor (DTHFP/active butyl lithium_1 mol/mol=0, 935).

The mixture was heated up to 40° C. with stirring. The impurities in the system were titrated by stepwise addition of butyllithium. Recognizing the endpoint, the polymerization was started by the addition of an amount corresponding to the target molecular weight of 278 kg/mol via pump within 2 minutes (Buli_1: 9.206 mmol, 6.56% of total Buli). Then the polymerization started. The temperature in the reactor increased to 60° C. within 20 minutes and then hold constant for 34 minutes. Butadiene (893 g) and styrene (240 g) were charged during 45 minutes to the reaction mixture starting 18 minutes after butyllithium charge. After that the temperature was allowed to increased further to finally 78° C. and the reaction proceed for 30 minutes. The monomer conversion was determined to 99.5%. 1.19 mmol Tetramethoxysilane were charged as coupling agent to obtain the high molecular portion (A). 30 minutes later, a sample was taken and analysed as follows: Mp 381886 g/mol, Mw 732423 g/mol, polydispersity D 1.61, portion of coupled polymer 42.7%, composition: 21.1% styrene, vinyl (1,2-polybutadiene, calculated on the butadiene fraction)=56.1%, Tg–30.8° C. A second charge of n-butyllithium (131.13 mmol resp. 95.44% of total Buli) was done and 10 minutes under stirring distributed in the polymer solution. 544.7 g butadiene were charged within 10 minutes for polymerization of the polymer oil component (B). The modifying agent (a) dimethyldimethoxysilane was charged 15 minutes later (1.17 mol/total charged active butyllithium) and the reaction finally terminated by charge of 0.3 mol methanol/mol active butyllithium 30 minutes later. No remaining styrene monomer was detectable and the residual butadiene in the polymer solution was analyzed to 25 ppm The 4,6-bis (octylthiomethyl)-o-cresol sold under the tradename IRGANOX 1520 (Ciba, 0.2 phr) was introduced as antioxidant. The polymer was then recovered from the solution via steam stripping at 100° C., milled to small crumbs and dried in an oven with air circulation at 70° C. for 30 min. Finally, the polymer crumbs were dried under ambient conditions on air until a content of residual volatiles was reached below 0.75%.

The resulting polymer was analyzed by SEC as polystyrene equivalents: Mp=399714, Mw=627644, Mn 57080, Mw/Mn 11. The recalculated portion (A_end) of the polymer chain corresponds to a molecular weight Mp of 17828 g/mol as polystyrene equivalents and 4% of the polymer chain. The portion of coupled high molecular polymer chains contributes to 35%, portion (B) of functionalized low molecular polymer to 15.4% (Mp 10093, Mw 10372 g/mol), portion of functionalized high molecular weight elastomer to 49.6% of the total polymer blend. ML1+4=62 MU The microstructure and styrene block content were measured by 1H-NMR. The following results were obtained: styrene=17.5%, vinyl (1,2-polybutadiene, calculated on the butadiene fraction)=47.6%. Only one single Tg was analysed at –45.2° C.

Inventive Example E2

The polymer was produced as described for polymer E1 with the exception that the modifying compound (b) 1,6-Bis-[(dimethoxymethylsilyl)]hexane was charged instead of modifying compound (a) to functionalize the polymer chain ends.

The monomer conversion after polymerization of the component (A) was determined to 100% and the polymer (A) analyzed as follows: Mp 406885 g/mol, Mw 707525, D 1.56, portion of coupled polymer=34.7%, composition: 21% styrene, vinyl (1,2-polybutadiene, calculated on the butadiene fraction)=56.5%, Tg–30° C.

No residual styrene monomer and 25 ppm butadiene were determined in the final polymer solution after step (iii). The final resulting polymer blend was analyzed by SEC as polystyrene equivalents to Mp=417351, Mw=630779, Mn 71939, Mw/Mn 8.77. The portion (A_end) of the polymer chain corresponds to a molecular weight Mp of 10466 g/mol and 2.2% of the polymer chain. The portion of coupled polymer chains contributes to 31.2%, portion (B) of functionalized low molecular polymer to 14.7% (Mp 10485, MW 15568 g/mol), portion of functionalized high molecular weight elastomer to 54.1 weight % of the total polymer blend. ML1+4=71 MU.

The microstructure and styrene block content were measured by 1H-NMR. The following results were obtained: styrene=17.5%, vinyl (1,2-polybutadiene, calculated on the butadiene fraction)=48.1%. Only one single glass transition temperature was analyzed (Tg–44.9° C.)

Inventive Example E3

The polymer was produced as described for polymer E1 with the exception that the modifying compound (c) (MeO)2(Me)Si—(CH2)3-S—SiMe2C(Me)3
was charged instead of modifying compound (a) to functionalize the polymer chain ends. The monomer conversion after polymerization of the component (A) was determined to 100% and the polymer (A) analyzed as follows analyzed as follows: Mp 422717 g/mol, Mw 621927, D 1.42, portion of coupled polymer=31.3%, composition according NMR 21.1% styrene, vinyl (1,2-polybutadiene, calculated on the butadiene fraction)=57.4%, Tg–29.4° C.

No residual styrene monomer and 55 ppm butadiene were determined in the final polymer solution after step (iii). The finally resulting polymer was analyzed by GPC as polystyrene equivalents: Mp=437084, Mw=536405, Mn 61001, Mw/Mn 8.79. The portion (A_end) of the polymer chain corresponds to a molecular weight Mp of 14367 g/mol and 2.9% of the polymer chain.

The portion of coupled polymer chains contributes to 26.5%, portion (B) of functionalized low molecular polymer to 16.2% (Mp 11571, Mw 12062 g/mol), the portion of functionalized high molecular weight elastomer to 57.3%. The Mooney viscosity ML1+4 was analyzed to 64 MU.

The microstructure and styrene block content were measured by 1H-NMR. The following results were obtained: styrene=17.4%, vinyl (1,2-polybutadiene, calculated on the butadiene fraction)=48.6%. Only one single glass transition temperature was analyzed (Tg–43.6° C.).

Preparation of the State of the Art Polymers
High Molecular Polymer HMP 1

Dry cyclohexane (19436 g) was added to an air-free, nitrogen-purged 40-L stainless steel reactor. 1,3-Butadiene (1135 g), styrene (306 g), and DTHFP (9 mmol) were fed into the reactor (DTHFP/active butyl lithium mol/mol=0, 935).

The mixture was heated up to 40° C. with stirring. The impurities in the system were titrated by stepwise addition of butyllithium. Recognizing the endpoint, the polymerization was started by the addition of an amount corresponding to the target molecular weight of 278 kg/mol via pump within 2 minutes. Then the polymerization started. The temperature in the reactor increased to 60° C. within 20 minutes and then hold constant for 34 minutes. Butadiene (893 g) and styrene (240 g) were charged during 45 minutes to the reaction mixture starting 18 minutes after butyllithium charge. After that the temperature increased further to finally 78° C. 1.19 mmol Tetramethoxysilane were charged 30 minutes later as coupling agent. 40 minutes later, 25.2 g butadiene were charged within 10 minutes. The modifying agent (a) was charged 15 minutes later. The reaction was finally terminated by charge of 0.3 mol methanol/mol active butyllithium 30 minutes later. The 4,6-bis (octylthiomethyl)-o-cresol sold under the tradename IRGANOX 1520 (Ciba, 0.2 phr) was introduced as antioxidant.

The resulting polymer was analyzed by GPC as polystyrene equivalents: Mn=494214, Mw=797733, D=1.61, portion of coupled polymer chains 43%.

The microstructure and styrene block content were measured by 1H-NMR. The following results were obtained: styrene=20.9%, vinyl (1,2-polybutadiene, calculated on the butadiene fraction)=56.2%, Tg−31° C., ML1+4=118 MU.

A portion of the polymer solution was used for preparation of a solution blend SB1 (Comparison sample C1_a).

A second portion was dried to separate the polymer HMP1 for use in the compounding process for comparison sample C1_b.

High Molecular Polymer HMP2

The polymer was produced as described for polymer HMP1 with the exception that the modifying compound (b) 1,6-Bis-[(dimethoxy)methylsilyl]hexane was charged instead of modifying compound (a) to functionalize the polymer chain ends.

A portion of the polymer solution was used for preparation of a solution blend SB2 (Comparison sample C2_a).

A second portion was dried to separate the polymer HMP2 for use in the compounding process for comparison sample C2_b.

High Molecular Polymer HMP3

The polymer was produced as described for polymer HMP1 with the exception that the modifying compound (c) (MeO)2(Me)Si—(CH2)3-S—SiMe2C(Me)3
was charged instead of modifying compound (a) to functionalize the polymer chain ends. A portion of the polymer solution was used for preparation of a solution blend SB3 (Comparison sample C3_a).

A second portion was dried to separate the polymer HMP3 for use in the compounding process for comparison sample C3_b.

Low Molecular Weight Polymer LMP1

5873.4 g cyclohexane and 5.13 mmol DTHFP were charged to a 10 l reactor and heated up to 78° C. 50.66 mmol n-butyllithium were added and distributed under stirring for 10 minutes in the mixture. Next, 242 g Butadiene corresponding to a target molecular weight of 4.75 kg/mol were charged within 15 minutes to the reactor. The temperature of the polymerization mixture rose due to the polymerization heat to 89° C. 30 minutes later, 5.126 mmol of the functionalization agent (a) were charged. The polymer chains were terminated 30 minutes later with 15.2 mmol methanol and stabilized by addition of 0.2 phr Irganox 1520. The molecular weight was determined as polystyrene equivalents to Mn 12082 g/mol. The composition was determined to 21.5% vinyl content and 78.5% 1.4-content. The Tg was found to be −84.6° C.

A portion of the polymer solution was used for preparation of a solution blend SB1 (Comparison sample C1_a).

A second portion was dried to separate the polymer LMP1 for use in the compounding for comparison sample C1_b.

Low Molecular Weight Polymer LMP2

The polymer was produced as described for polymer LMP1 with the exception that the modifying compound (b) 1,6-Bis-[(dimethoxy)methylsilyl]hexane was charged instead of modifying compound (a) to functionalize the polymer chain ends.

A portion of the polymer solution was used for preparation of a solution blend SB2 (Comparison C2_a).

A second portion was dried to separate the polymer LMP2 for use in the compounding for comparison sample C2_b.

Low Molecular Weight Polymer LMP3

The polymer was produced as described for polymer LMP1 with the exception that the modifying compound (c) (MeO)2(Me)Si—(CH2)3-S—SiMe2C(Me)3
was charged instead of modifying compound (a) to functionalize the polymer chain ends. A portion of the polymer solution was used for preparation of a solution blend SB3 (Comparison sample C3_a).

A second portion was dried to separate the polymer LMP3 for use in the compounding for comparison sample C3_b.

Preparation of State of the Art Polymer Blends

Polymer blends according to the present invention were prepared using the polymer solutions, described above.

SB 1 (Solution Blend 1, Comparative C1 a)

The polymer solution of polymer HMP1 was mixed with the polymer solution of polymer LMP1 to obtain a polymer consisting of ratio 83.3 percent by weight polymer HMP1 and 16.7 percent by weight polymer LMP1. The polymer was then recovered from the solution via steam stripping at 100° C., milled to small crumbs and dried in an oven with air circulation at 70° C. for 30 min. Finally, the polymer crumbs were dried under ambient conditions on air until a content of residual volatiles was reached below 0.75%. The following data were determined for the resulting polymer solution blend SB 1: Mp 419413 g/mol, Mw 687916 g/mol, portion of coupled polymer chains 36.5%, portion of functionalized low molecular polymer 15.1%, portion of functionalized high molecular weight elastomer 48.4%, Composition: 17.3% Styrene content, 49.2% Vinyl content, Tg−42.7° C., ML1+4=66 MU.

SB 2 (Solution Blend 2, Comparative C2-a)

The polymer was produced as described for SB1 with the exception that instead of HMP1 HMP2 solution and instead of LMP1 LMP2 solution was used. The following data were determined for the resulting polymer SB 2: Mp 420554 g/mol, Mw 670865 g/mol, portion of coupled polymer chains 36.2%, portion of functionalized low molecular polymer 15.3%, portion of functionalized high molecular weight elastomer 48.5%, Composition 17.4% Styrene content, 49.8% Vinyl content, Tg−43.1° C., ML1+4=69 MU.

SB 3 (Solution Blend 3, Comparative C3 a)

The polymer was produced as described for SB1 with the exception that instead of HMP1 HMP3 solution and instead of LMP1 LMP3 solution was used. The following data were determined for the resulting polymer blend SB 3: Mp 416213 g/mol, Mw 669915 g/mol, portion of coupled polymer chains 35.9%, portion of functionalized low molecular polymer 15.7%, portion of functionalized high molecular weight elastomer 48.4%, 17.3% Composition: styrene content, 49.1% vinyl content, Tg−43.3° C., ML1+4=63 MU.

Preparation of Compounds

The polymers were compounded by kneading according to the formulations shown in table 1 in a standard two-step compound recipe with silica as filler in an internal lab mixer comprising Banbury rotor type with a total chamber volume of 380 cm³. The first mixing step was performed with a filling degree of 72% using an initial temperature of 50° C. After adding the rubber, the filler and all other ingredients described in the formulations for step 1, the rotor speed of the internal mixer is controlled to reach a temperature range between 145-160° C. for up to 4 minutes, so that silanization reaction can occur. The total mixing time for the first step is 7 min. After dumping the compound the mixture is cooled down and stored for relaxing before adding the curing system in the second mixing step. The second mixing step was done in the same equipment by using a fill factor of 69% at an initial temperature of 50° C. The compound from first mixing step, sulphur, DPG and TBBS were added and mixed for a total time of 3 min. All amounts are given in gram.

Compound version 1 was used for all inventive examples E and the corresponding solution blends Comparison C_a. Compound version 2 was used when the high molecular polymer and the low molecular polymer were separately charged in the internal mixer to get the Comparison C_b. Compound version 1 comprises a larger portion of the respective in situ or solution blends as SSBR phase since on top of the same amount and therefore volume fraction of high molecular weight polymer, these rubber grades accommodate 20 phr of low molecular weight polymer. In contrast, for compound version 2 the same amount of low molecular weight polymer is added during 1st mixing stage resulting in same volume fractions of high and low molecular weight polymers for both compound versions.

TABLE 1

| Compound formulations | | |
|---|---|---|
| Compound version | 1 [g] | 2 [g] |
| 1. Mixing step | | |
| 5J20-11 (1) | 30.21 | 30.00 |
| Blend (InSitu or Solution blend) | 145.00 | |
| High molecular weight polymer | | 120.00 |
| ⅔ Ultrasil 7000GR (2) | 80.00 | 80.00 |
| ⅓ Ultrasil 7000GR (2) | 40.83 | 40.00 |
| Silan Si75 (3) | 10.42 | 10.35 |
| Stearic acid (4) | 1.51 | 1.50 |
| Dusantox 6 PPD (5) | 3.02 | 3.00 |
| Zinkoxide (6) | 3.78 | 3.75 |
| Antilux 654 (7) | 2.27 | 2.25 |
| TDAE Vivatec 500 (8) | 6.04 | 6.00 |
| Low molecular weight polymer | | 24.00 |
| Sum | 323.08 | 320.85 |
| 2. Mixing step | | |
| Batch 1. Mixing step | 303.00 | 303.00 |
| Sulfur (9) | 2.30 | 2.30 |
| TBBS (10) | 2.46 | 2.46 |
| Ekaland DPG-PD (11) | 2.46 | 2.46 |
| Sum | 310.23 | 310.23 |

(1) Trinseo Deutschland GmbH;
(2) Evonik Industries AG
(3) Bis(triethoxysilylpropyl)disulfan, sulfur equivalents per molecule: 2.35; Evonic Industries AG;
(4) Cognis GmbH;
(5) N-(1,3-dimethylbutyl)-N'-phenyl-1,4-benzenediamine, Duslo, a.s.;
(6) Grillo-Zinkoxid GmbH;
(7) Light & ozone protective wax, Rhein Chemie Rheinau GmbH
(8) Hansen & Rosenthal;
(9) SOLVAY & CPC BARIUM STRONTIUM GmbH & Co. KG;
(10) N-tert-Butyl-2-benzothiazyl-sulfenamide; Rhein Chemie Rheinau GmbH;
(11) Diphenylguanidine, MLPC International, Arkema Group.

Results:

The results measured for the silica filled vulkanizates are given in table 2. The new inventive rubber examples E1, E2, E3 show significantly improved dynamic performance versus the corresponding comparison examples C1-a, C2-a, C3-a prepared by solution blending and the comparison examples C1-b, C2-b, C3-b prepared by separate charge of the low molecular weight polymer and the high molecular weight polymer into the kneader for compounding and vulcanization independently from the applied modification agent.

Especially the HBU (heat generation at dynamic load, lower is better) is improved in combination with an improved tan d @60° C. (lower is better) which is a laboratory predictor for rolling resistance of the tire at a similar abrasion level and similar modules. Furthermore, the dry handling-snow grip balance (Lab predictor E'@60° C./E'@−25° C., higher is better) as well as the wet grip/snow grip balance (lab predictor tand @0° C.*$10^3$/E'@−25° C., higher is better) are additional improved for the new inventive rubber examples E1, E2, E3 versus the corresponding comparison examples C1-a, C2-a, C3-a prepared by solution blending and the comparison examples C1-b, C2-b, C3-b prepared by separate charge of the low molecular weight polymer and the high molecular weight polymer into the kneader for compounding and vulcanization.

It is also to see, that the performance improvement of the blends obtained by the new inventive process versus the separate charge of the blend components into the kneader or the solution blended functionalized polymer blend is achieved independent from the applied modification compound.

Additionally, the process for preparation is more time and cost efficient.

TABLE 2

| Data of the silica filled vulcanizates | | | | | | | | | |
|---|---|---|---|---|---|---|---|---|---|
| | Example E1 Inventive InSitu blend | Comparison 1-a Solution blend | Comparison 1-b Separate charge | Example E2 Inventive InSitu blend | Comparison 2-a Solution blend | Comparison 2-b Separate charge | Example E3 Inventive InSitu blend | Comparison 3-a Solution blend | Comparison 3-b Separate charge |
| Modification agent | (a) | (a) | (a) | (b) | (b) | (b) | (c) | (c) | (c) |
| M100 | 2.5 | 2.7 | 2.6 | 2.7 | 2.8 | 2.7 | 3.0 | 2.7 | 2.7 |
| M300 | 13.8 | 13.6 | 13.3 | 14.4 | 14.1 | 14.4 | 16.8 | 15.1 | 16.1 |
| M300 − M100 | 11.3 | 10.9 | 10.7 | 11.7 | 11.3 | 11.7 | 13.8 | 12.4 | 13.4 |

TABLE 2-continued

Data of the silica filled vulcanizates

| | Example E1 Inventive InSitu blend | Comparison 1-a Solution blend | Comparison 1-b Separate charge | Example E2 Inventive InSitu blend | Comparison 2-a Solution blend | Comparison 2-b Separate charge | Example E3 Inventive InSitu blend | Comparison 3-a Solution blend | Comparison 3-b Separate charge |
|---|---|---|---|---|---|---|---|---|---|
| HBU (° C.) | 113.5 | 119.2 | 119.3 | 115.8 | 118.3 | 117.1 | 110.4 | 113.9 | 111.7 |
| DIN abrasion (mm³) | 130 | 129 | 135 | 120 | 121 | 121 | 122 | 134 | 127 |
| Tan d 60° C. | 0.101 | 0.126 | 0.126 | 0.115 | 0.137 | 0.133 | 0.089 | 0.104 | 0.105 |
| E'@60° C./E'@-25° C. | 0.24 | 0.19 | 0.17 | 0.18 | 0.16 | 0.15 | 0.19 | 0.18 | 0.18 |
| tand@0° C./E'@-25° C. | 15.6 | 11.6 | 11.1 | 9.1 | 7.8 | 8.3 | 8.8 | 8.7 | 8.5 |
| Tan d Max | 0.921 | 0.889 | 0.881 | 0.912 | 0.882 | 0.902 | 0.986 | 0.951 | 0.950 |

The invention claimed is:

1. A method for the preparation of a synthetic rubber blend, the method comprising the step of:
polymerizing at least one conjugated diene monomer in the presence of one or more polymerization initiators and, optionally, a polar agent in an organic solvent, wherein the step of polymerizing the at least one conjugated diene monomer comprises
(i) a first stage of providing the organic solvent, a first portion of the at least one conjugated diene monomer and a first portion of the one or more polymerization initiators, and, optionally, a first portion of the polar agent; and polymerizing the at least one conjugated diene monomer up to a conversion rate of at least 95% to give a mixture comprising a living polydiene polymer or copolymer;
and optionally adding to and reacting with the living polydiene polymer or copolymer a coupling agent to obtain a mixture comprising a living and coupled polymer;
(ii) a second stage of adding to the mixture of stage (i) a second portion of the one or more polymerization initiators as well as a second portion of the at least one conjugated diene monomer and, optionally, a polar agent;
and polymerizing to obtain a blend comprising a high molecular weight polydiene (A), and a low molecular weight polydiene (B), wherein the high molecular weight polydiene (A) has a weight average molecular weight (Mw) of from 500 -3000 kg/mol and wherein the low molecular weight polydiene (B) has a weight average molecular weight (Mw) of from 0.5-100 kg/mol; and
optionally (iii) a third stage of adding to the blend obtained in stage (ii) at least one chain end modifying compound to obtain a blend comprising a chain end modified high molecular weight polydiene (A), and a chain-end modified low molecular weight polydiene (B),
wherein the blend has a molecular weight distribution Mw/Mn of from 3 to 150 and the blend comprises 75-90 parts by weight of the high molecular weight polydiene (A); and 10-25 parts by weight of the low molecular weight polydiene (B).

2. The method according to claim 1, wherein the step of polymerizing the at least one conjugated diene monomer comprises the third stage (iii).

3. The method according to claim 1, wherein
the polymerization initiator comprises an organolithium compound;
and/or wherein the polar agent comprises an ether compound; and/or a tertiary amine compound; or a combination of any two or more of the ether and amine compounds;
and/or wherein the solvent is selected from the group consisting of cyclohexane, butane, hexane and heptane, and mixtures thereof.

4. The method according to claim 1, wherein the chain end modifying compounds are represented by any one of the following Formulas 7, 8, 9, 10, 11, 12, 13, 14, 15 and 16 and Lewis base adducts thereof:

$$(R^{30})e\ Si(OR^{29})f \qquad \text{Formula 7}$$

wherein Si is a silicon atom;
$R^{29}$ is independently selected from $(C_1\text{-}C_4)$ alkyl, $(C_6\text{-}C_{18})$ aryl and $(C_7\text{-}C_{18})$ alkylaryl;
$R^{30}$ is independently selected from $(C_1\text{-}C_{18})$ alkyl, $(C_1\text{-}C_{18})$ alkoxy, (C6-C18) aryl, $(C_7\text{-}C_{18})$ alkylaryl and $R^{34}\text{-}(C_2H_4O)g\text{—}O\text{—}$, wherein $R^{34}$ is selected from $(C_5\text{-}C_{23})$ alkyl, $(C_5\text{-}C_{23})$ alkoxy, $(C_6\text{-}C_{18})$ aryl and $(C_7\text{-}C_{25})$ alkylaryl and e is selected from 0, 1 and 2; f is selected from 1, 2, 3 and 4; and e+f=4 and g is selected from 4, 5, and 6;

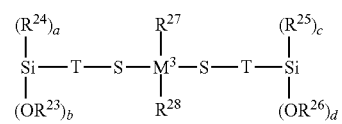

Formula 8 wherein $M^3$ is a silicon atom or a tin atom;
T is at least divalent and is selected from $(C_6\text{-}C_{18})$ aryl, $(C_7\text{-}C_{18})$ alkylaryl and $(C_1\text{-}C_{18})$ alkyl, wherein each group is optionally substituted with one or more groups selected from di $(C_1\text{-}C_7$ hydrocarbyl)amino, bis(tri$(C_1\text{-}C_{12}$ alkyl)silyl)amino, tris$(C_1\text{-}C_7$ hydrocarbyl)silyl, $(C_7\text{-}C_{18})$ alkylaryl and $(C_6$-C18) aryl;
$R^{23}$ and $R^{26}$ are each independently selected from (C1-C4) alkyl;
$R^{24}$, $R^{25}$, $R^{27}$ and $R^{28}$ are each independently selected from $(C_1\text{-}C_{18})$ alkyl, $(C_6\text{-}C_{18})$ aryl and $(C_7\text{-}C_{18})$ alkylaryl;
a and c are each independently selected from 0, 1 and 2;
b and d are each independently selected from 1, 2 and 3; a+b=3; and c+d=3;

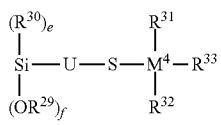

Formula 9 wherein M⁴ is a silicon atom or a tin atom;

U is at least divalent and is selected from ($C_6$-$C_{18}$) aryl, ($C_7$-$C_{18}$) alkylaryl and ($C_1$-$C_{18}$) alkyl, wherein each group is optionally substituted with one or more groups selected from di($C_1$-$C_7$ hydrocarbyl)amino, bis(tri($C_1$-$C_{12}$ alkyl)silyl)amino, tris($C_1$-$C_7$ hydrocarbyl)silyl, ($C_7$-$C_{18}$) alkylaryl and ($C_6$-$C_{18}$) aryl;

$R^{29}$ is independently selected from ($C_1$-$C_4$) alkyl, ($C_6$-$C_{18}$) aryl and ($C_7$-$C_{18}$) alkylaryl;

$R^{31}$, $R^{32}$ and $R^{33}$ are each independently selected from ($C_1$-$C_{18}$) alkyl, ($C_1$-$C_{18}$) alkoxy, ($C_6$-$C_{18}$) aryl and ($C_7$-$C_{18}$) alkylaryl;

$R^{30}$ is independently selected from ($C_1$-$C_{18}$) alkyl, ($C_1$-$C_{18}$) alkoxy, ($C_6$-$C_{18}$) aryl, ($C_7$-$C_{18}$) alkylaryl and $R^{34}$-($C_2H_4O$)g—O—, wherein $R^{34}$ is selected from ($C_5$-$C_{23}$) alkyl, ($C_5$-$C_{23}$) alkoxy, ($C_6$-$C_{18}$) aryl and ($C_7$-$C_{25}$) alkylaryl and g is selected from 4, 5 and 6;

e is selected from 0, 1 and 2; f is selected from 1, 2 and 3; and e+f=3;

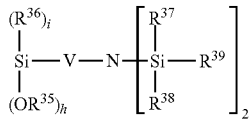

Formula 10

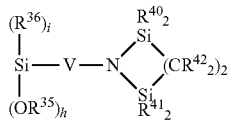

Formula 11 wherein V is at least divalent and is selected from ($C_6$-$C_{18}$) aryl, ($C_7$-$C_{18}$) alkylaryl and ($C_1$-$C_{18}$) alkyl, wherein each group is optionally substituted with one or more groups selected from di($C_1$-$C_7$ hydrocarbyl)amino, bis(tri($C_1$-$C_{12}$ alkyl)silyl)amino, tris($C_1$-$C_7$ hydrocarbyl)silyl, ($C_7$-$C_{18}$) alkylaryl and ($C_6$-$C_{18}$) aryl;

$R^{35}$ is independently selected from ($C_1$-$C_4$) alkyl, ($C_6$-$C_{18}$) aryl and ($C_7$-$C_{18}$) alkylaryl;

$R^{37}$, $R^{38}$, $R^{39}$, $R^{40}$, $R^{41}$ and $R^{42}$ are each independently selected from ($C_1$-$C_{18}$) alkyl, ($C_1$-$C_{18}$) alkoxy, ($C_6$-$C_{18}$) aryl and ($C_7$-$C_{18}$) alkylaryl;

$R^{36}$ is independently selected from ($C_1$-$C_{18}$) alkyl, ($C_1$-$C_{18}$) alkoxy, ($C_6$-$C_{18}$) aryl, ($C_7$-$C_{18}$) alkylaryl and $R^{43}$—($C_2H_4O$)j—O—, wherein $R^{43}$ is selected from ($C_5$-$C_{23}$) alkyl, ($C_5$-$C_{23}$) alkoxy, ($C_6$-$C_{18}$) aryl and ($C_7$-$C_{25}$) alkylaryl; and j is selected from the 4, 5 and 6;

i is selected from 0, 1 and 2; h is selected from 1, 2 and 3; and i+h=3;

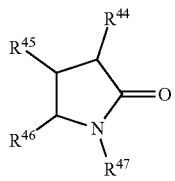

Formula 12

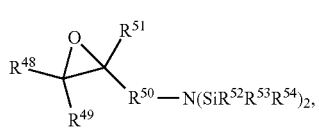

Formula 13 wherein $R^{44}$, $R^{45}$, $R^{46}$, $R^{47}$, $R^{48}$, $R^{49}$, $R^{51}$, $R^{52}$, $R^{53}$ and $R^{54}$ are each independently selected from hydrogen, ($C_1$-$C_{16}$) alkyl, ($C_6$-$C_{16}$) aryl and ($C_7$-$C_{16}$) alkylaryl; and $R^{50}$ is at least divalent and is selected from ($C_6$-$C_{18}$) aryl, ($C_7$-$C_{18}$) alkylaryl and ($C_1$-$C_{18}$) alkyl, wherein each group is optionally substituted with one or more groups selected from di($C_1$-$C_7$ hydrocarbyl)amino, bis(tri($C_1$-$C_{12}$ alkyl)silyl)amino, tris($C_1$-$C_7$ hydrocarbyl)silyl, ($C_7$-$C_{18}$) alkylaryl and ($C_6$-$C_{18}$) aryl;

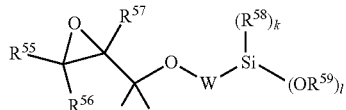

Formula 14

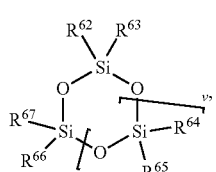

Formula 15

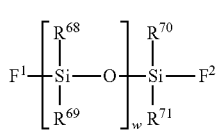

Formula 16 in Formulas 14, 15 and 16, $R^{55}$, $R^{56}$, $R^{57}$, $R^{58}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ are each independently selected from hydrogen, ($C_1$-$C_{16}$) alkyl, ($C_6$-$C_{16}$) aryl and ($C_7$-$C_{16}$) alkylaryl;

$R^{59}$ is selected from ($C_1$-$C_4$) alkyl, ($C_6$-$C_{18}$) aryl and ($C_7$-$C_{18}$) alkylaryl;

W is at least divalent and is selected from ($C_6$-$C_{18}$) aryl, ($C_7$-$C_{18}$) alkylaryl and ($C_1$-$C_{18}$) alkyl, wherein each group is optionally substituted with one or more groups selected from di($C_1$-$C_7$ hydrocarbyl)amino, bis(tri($C_1$-$C_{12}$ alkyl)silyl)amino, tris(C1-C7 hydrocarbyl)silyl, ($C_7$-$C_{18}$) alkylaryl and ($C_6$-$C_{18}$) aryl;

k is selected from 0, 1 and 2; l is selected from 1, 2 and 3; k+l=3; and v is selected from 1 to 20;

$F^1$ and $F^2$ are independently selected from hydrogen, hydroxy, chlorine, bromine, iodine, —Si$R^{52}R^{53}R^{54}$, wherein $R^{52}$, $R^{53}$, $R^{54}$ are the same or different and are as defined for Formulas 12 and 13, vinyl, ($C_6$-$C_{16}$) aryl, ($C_7$-$C_{16}$) alkylaryl and ($C_1$-$C_{16}$) alkyl, wherein each hydrocarbyl group is optionally substituted with one or more groups selected from hydroxyl, di($C_1$-$C_7$ hydrocarbyl)amino, bis(tri($C_1$-$C_{12}$ alkyl)silyl)amino and an epoxy group.

5. The method according to claim 1, wherein the coupling agent is selected from the group consisting of tin halides, silicon halides, tin alkoxides, silicon alkoxides, and mixtures thereof.

6. The method according to claim 1, wherein the conjugated diene monomer is selected from 1,3-butadiene, 1,2-butadiene, 2-alkyl-1,3-butadiene, 2-methyl-1,3-butadiene, 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene and/or 1,3-cyclooctadiene; and/or wherein the one or more alpha olefin monomers are selected from vinyl aromatic monomers and from vinyl silanes; the vinyl aromatic monomers comprising styrene, 2-methylstyrene, 3-methylstyrene, 4-methylstyrene, 2,4-dimethylstyrene, 2,4,6-trimethylstyrene, α-methylstyrene, stilbene, 2,4-diisopropylstyrene,4-tert-butylstyrene, vinyl benzyl dimethylamine, (4-vinylbenzyl)dimethyl aminoethyl ether, N,N-dimethylaminoethyl styrene, N,N-bis-(trialkylsilyl)aminostyrene, tert-butoxystyrene, vinylpyridine, and/or divinylbenzene, and vinyl silanes comprising vinyl silyl-piperazine monomers, aminovinylsilanes and/or combinations of these monomers.

7. The method according to claim 1, wherein the first and/or the second stage of the step of polymerizing the at least one conjugated diene monomer is carried out at a temperature of from 10° C. to 100° C.; and/or wherein the conversion rate in the first stage (i) of the at least one conjugated diene monomer is more than 95%.

8. The method according to claim 1, wherein the ratio of the first and of the second portion of the at least one conjugated diene monomer based on the total amount of conjugated diene monomer, alpha olefin monomers provided in the first and in the second stage is as follows:
first portion monomer is of 0.93-0.5; and second portion monomer is of 0.07-0.5;
wherein the ratio of the first and of the second portion of the polymerization initiator based on the total amount of initiator moles provided in the first and in the second stage is:
first portion initiator is of from 0.033-86.9 mole % of total initiator second portion initiator is of from 99.967-13.1 mole % of total initiator.

9. The method according to claim 1, wherein the method comprises a fourth stage (iv) of adding and reacting a polymer chain terminating agent and one or more antioxidants and removing the solvent from the blend obtained in stage (ii) or stage (iii).

10. A synthetic rubber blend obtainable according to the method of claim 1.

11. The synthetic rubber blend according to claim 10, wherein the blend has a single glass transition temperature, and/or wherein the Mooney viscosity of the blend is in the range of from 30 to 100.

12. A rubber composition comprising the blend of claim 10.

13. A rubber composition of claim 12, further comprising filler and/or further comprising one or more additional rubber selected from the group consisting of styrene butadiene rubber, butadiene rubber, synthetic isoprene rubber and natural rubber.

14. A method for the preparation of a cross-linked rubber composition, the method comprising the step of adding one or more vulcanizing agent to the synthetic rubber blend according to claim 10.

15. A cured rubber composition obtainable according to the method of claim 14.

16. An article comprising a cured rubber composition according to claim 15, wherein the article is a tire, a tire tread, a tire side wall, a conveyer belt, a seal or a hose.

17. A method for the preparation of a cross-linked rubber composition, the method comprising the step of adding one or more vulcanizing agent to the rubber composition according to claim 13 and cross-linking the composition.

* * * * *